US012379861B2

United States Patent
Zhang et al.

(10) Patent No.: US 12,379,861 B2
(45) Date of Patent: Aug. 5, 2025

(54) DATA PROCESSING METHOD, APPARATUS, AND SYSTEM OF ACCESS FREQUENCY PREDICTION BASED ON FIRST BLOCK AND BLOCK ADJACENT TO THE FIRST BLOCK

(71) Applicant: HUAWEI TECHNOLOGIES CO., LTD., Guangdong (CN)

(72) Inventors: Fan Zhang, Hong Kong (CN); Gang Hu, Chengdu (CN); Yingying Cheng, Shenzhen (CN); Gong Zhang, Shenzhen (CN); Zhuo Cheng, Zürich (CH)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/588,775

(22) Filed: Feb. 27, 2024

(65) Prior Publication Data

US 2024/0192880 A1  Jun. 13, 2024

Related U.S. Application Data

(63) Continuation of application No. PCT/CN2022/115437, filed on Aug. 29, 2022.

(30) Foreign Application Priority Data

Aug. 31, 2021  (CN) .......................... 202111018067.4

(51) Int. Cl.
*G06F 3/06*  (2006.01)
(52) U.S. Cl.
CPC .............. *G06F 3/064* (2013.01); *G06F 3/061* (2013.01); *G06F 3/0685* (2013.01)

(58) Field of Classification Search
CPC ......... G06F 3/064; G06F 3/061; G06F 3/0685
See application file for complete search history.

(56) References Cited

U.S. PATENT DOCUMENTS

| | | | |
|---|---|---|---|
| 2014/0281260 A1* | 9/2014 | Peterson | G06F 3/0679 711/135 |
| 2020/0326871 A1* | 10/2020 | Wu | G06F 3/0647 |
| 2021/0240372 A1 | 8/2021 | Loh et al. | |

FOREIGN PATENT DOCUMENTS

| | | |
|---|---|---|
| CN | 112379842 A | 2/2021 |
| WO | 2021022852 A1 | 2/2021 |

OTHER PUBLICATIONS

Rambus Press:"When memory and storage converge." Oct. 15, 2015, URL: https://www.rambus.com/blogs/mid-when-memory-and-storage-converge/. total 1 page.

(Continued)

*Primary Examiner* — Chie Yew
(74) *Attorney, Agent, or Firm* — WOMBLE BOND DICKINSON (US) LLP

(57) ABSTRACT

This application discloses a data processing method. A first apparatus obtains a first feature of a first data block in storage space. The first feature includes a read/write feature related to the first data block and a read feature of a second data block adjacent to the first data block. The first apparatus inputs the first feature into an access frequency prediction model, to obtain access frequency of the first data block. The access frequency of the first data block is used to determine a type of the first data block. To be specific, in embodiments of this application, future access frequency of the first data block is predicted by using a multidimensional feature of the first data block (the read/write feature of the first data block and a read feature of an adjacent data block).

20 Claims, 9 Drawing Sheets

(56) References Cited

OTHER PUBLICATIONS

Justin J. Levandoski et al: "Identifying Hot and Cold Data in Main-Memory Databases." 2013 IEEE 29th International Conference on Data Engineering (ICDE), Apr. 8-12, 2013. total 12 pages.
C. Delimitrou, S. Sankar, K. Vaid and C. Kozyrakis, "Decoupling datacenter studies from access to large-scale applications: A modeling approach for storage workloads," 2011 IEEE International Symposium on Workload Characterization (IISWC), Austin, TX, USA, 2011, pp. 51-60, doi: 10.1109/IISWC.2011.6114196.
Boudewijn R. Haverkort et al: "Machine Learning Data Center Workloads Using Generative Adversarial Networks." Nov. 25, 2020, total 3 pages.
Milad Hashemi et al: "Learning Memory Access Patterns." arXiv:1803.02329v1 [cs.LG] Mar. 6, 2018. total 15 pages.

\* cited by examiner

DATA PROCESSING METHOD, APPARATUS, AND SYSTEM OF ACCESS FREQUENCY PREDICTION BASED ON FIRST BLOCK AND BLOCK ADJACENT TO THE FIRST BLOCK

CROSS-REFERENCE TO RELATED APPLICATIONS

This application is a continuation of International Application No. PCT/CN2022/115437, filed on Aug. 29, 2022, which claims priority to Chinese Patent Application No. 202111018067.4, filed on Aug. 31, 2021. The disclosures of the aforementioned applications are hereby incorporated by reference in their entireties.

TECHNICAL FIELD

This application relates to the field of communication technologies, and in particular, to a data processing method, apparatus, and system.

BACKGROUND

With continuous development of technologies such as big data, cloud computing, and artificial intelligence, requirements on database performance and capacity are increasingly high. Most existing databases use a hybrid storage architecture, in which tiers of storage media correspond to different access speeds and storage costs. It is important to store data in proper media based on factors such as a value and a life cycle of service data, to optimize access efficiency.

Generally, data stored in a database is classified into hot and cold data. The hot data is data that has a high requirement for real-time query and is accessed frequently. This type of data is stored in an efficient cloud disk to meet a high-performance access requirement. The cold data is data that is rarely queried and infrequently accessed. This type of data is stored in less expensive cold storage to meet a cost-effective storage requirement. How to distinguish between different types of data while ensuring system performance is a technical problem to be urgently resolved.

SUMMARY

Embodiments of this application provide a data processing method, apparatus, and system, to distinguish between different types of data and improve system performance.

To achieve the foregoing objective, a first aspect of embodiments of this application provides a data processing method. The method includes: A first apparatus obtains a first feature of a first data block. The first data block is any data block in storage space, and the first feature includes a read/write feature related to the first data block and a read feature of a second data block adjacent to the first data block. The first apparatus inputs the first feature into an access frequency prediction model, to obtain access frequency, output by the access frequency prediction model, of the first data block. The access frequency of the first data block is used to determine a type of the first data block. In an embodiment, to determine the type of the first data block, the first apparatus obtains the first feature of the first data block. The first feature not only includes the read/write feature of the first data block, but also includes the read feature of the second data block adjacent to the first data block. In other words, an access status of the first data block is reflected by using a multidimensional feature. The first apparatus inputs the obtained first feature into the pre-trained access frequency prediction model. In this way, the access frequency corresponding to the first data block at a future moment is determined by using the access frequency prediction model, and the type of the first data block is determined based on the access frequency.

In an embodiment, that a first apparatus obtains a first feature of a first data block includes: The first apparatus receives the first feature, sent by a second apparatus, of the first data block.

In an embodiment, the method further includes: The first apparatus sends the access frequency of the first data block to the second apparatus.

In an embodiment, the type of the first data block is the cold data or the hot data. In an embodiment, whether the first data block is the cold data or the hot data may be determined by using the access frequency of the first data block. Further, a storage location of the first data block is determined based on the type of the first data block. In this way, storage performance is improved. For example, when the first data block is the hot data, it indicates that the access frequency of the first data block high. To improve a read speed of the first data block, the first data block may be stored at a performance tier. When the first data block is the cold data, it indicates that the access frequency of the first data block is low. To prevent storage of the first data block from affecting a read speed of another piece of hot data, the first data block is stored in a capacity tier, to reduce resource occupation on the performance tier.

In an embodiment, the method further includes: When a feature length of the first feature changes, the first apparatus updates the access frequency prediction model to obtain the updated access frequency prediction model. In an embodiment, when the feature length of the first feature changes, to ensure prediction accuracy, the access frequency prediction model needs to be updated, so that the access frequency of the first data block is predicted by using the updated access frequency prediction model.

In an embodiment, the method further includes: The first apparatus obtains a second feature of the first data block. The feature length of the first feature is different from a feature length of the second feature. The first apparatus inputs the second feature into the updated access frequency prediction model, to obtain access frequency, output by the updated access frequency prediction model, of the first data block. In an embodiment, after the access frequency prediction model is updated, to improve prediction accuracy for the access frequency of the first data block, a feature of the first data block, that is, the second feature, is obtained for another time, to obtain the access frequency of the first data block by using the second feature and the updated access frequency prediction model.

In an embodiment, the method further includes: When the feature length of the first feature changes, the first apparatus receives an interrupt signal sent by the second apparatus. The interrupt signal indicates the first apparatus to suspend use of the access frequency prediction model to predict the access frequency of the first data block.

A second aspect of embodiments of this application provides a data processing method. The method further includes: A second apparatus obtains access frequency of a first data block. The access frequency of the first data block is obtained based on an access frequency prediction model and a first feature of the first data block. The first feature includes a read/write feature related to the first data block and a read feature of a second data block adjacent to the first data block. The first data block is any data block in storage space. The second apparatus determines a type of each first data block in the storage space based on access frequency of each first data block. In an embodiment, when the second apparatus needs to determine the type of each data block in the storage space, the second apparatus may obtain future access frequency corresponding to each data block, and determine the type of each data block based on the access frequency of each data block.

In an embodiment, that the second apparatus determines a type of each first data block in the storage space based on access frequency of each first data block includes: The second apparatus ranks first data blocks based on access frequency of the first data blocks to obtain a ranking result. The second apparatus determines types of the first data blocks in the storage space based on the ranking result. In an embodiment, after obtaining the access frequency of the first data blocks, the second apparatus may rank the first data blocks in descending order of the access frequency, and then determine the types of the first data blocks based on the ranking result. For example, first k first data blocks are determined as the hot data, and the remaining first data blocks are determined as the cold data.

In an embodiment of the data processing method according to the first aspect or the second aspect of embodiments of this application, the first feature includes a feature of the first data block at each of T historical time points. There is a temporal-spatial correlation between read/write features of the first data block at the T historical time points, and T is a positive integer. In an embodiment, the first feature includes features of the first data block at a plurality of historical time points, so that impact of the historical features is considered when the access frequency of the first data block is predicted, thereby improving prediction accuracy.

In an embodiment of the data processing method according to the first aspect or the second aspect of embodiments of this application, the read/write feature related to the first data block includes at least one of the following: a frequency feature of reading/writing the first data block, a length feature of reading the first data block, and an alignment feature of reading the first data block.

In an embodiment of the data processing method according to the first aspect or the second aspect of embodiments of this application, the read/write feature related to the first data block satisfies at least one of the following:

The frequency feature of reading/writing the first data block includes at least one of the following: frequency at which one or more access interfaces read the first data block, frequency at which the one or more access interfaces write the first data block, and total frequency at which the one or more access interfaces read/write the first data block; the length feature of reading the first data block includes at least one of the following: a maximum read length, a minimum read length, or an average read length; and/or the alignment feature of reading the first data block includes at least one of the following: a quantity of times of reading a first length, a quantity of times of reading a second length, and a proportion of the quantity of times of reading the first length to a total quantity of times of reading or a proportion of the quantity of times of reading the second length to the total quantity of times of reading. The first length indicates that a length is 2n, the second length indicates that a length is non-2n, and n is a positive integer.

In an embodiment of the data processing method according to the first aspect or the second aspect of embodiments of this application, the read feature of the second data block adjacent to the first data block includes at least read frequency features respectively corresponding to L second data blocks, and L is a positive integer.

In an embodiment of the data processing method according to the first aspect or the second aspect of embodiments of this application, the access frequency prediction model includes a first submodel and a second submodel. The first submodel is used to extract a temporal feature of the first feature, and the second submodel is used to extract a spatial feature of the first feature.

In an embodiment of the data processing method according to the first aspect or the second aspect of embodiments of this application, the access frequency prediction model further includes a third submodel. The third submodel is used to obtain a feature scale of the first feature.

In an embodiment of the data processing method according to the first aspect or the second aspect of embodiments of this application, the access frequency prediction model is generated through training based on to-be-trained features and labels corresponding to the to-be-trained features. The labels corresponding to the to-be-trained features are the access frequency.

In an embodiment, the method further includes: When the feature length of the first feature changes, the second apparatus obtains a new to-be-trained data set. The new to-be-trained data set includes a plurality of to-be-trained features and labels corresponding to the plurality of to-be-trained features. The new to-be-trained data set is used to train the access frequency prediction model, to obtain the updated access frequency prediction model. In an embodiment, when the feature length of the first feature changes, it indicates that the feature on which prediction of the access frequency depends changes. To ensure prediction accuracy, the access frequency prediction model needs to be updated. The second apparatus obtains the new to-be-trained data set, to train the access frequency prediction model by using the new to-be-trained data set. The updated access frequency prediction model is obtained, so that the access frequency of first data is predicted by using the updated access frequency prediction model.

In an embodiment, the method further includes: When the feature length of the first feature changes, the second apparatus may further send an interrupt signal to the first apparatus. The interrupt signal indicates the first apparatus to stop using the current access frequency prediction model to predict the access frequency of the first data block.

In an embodiment, the method further includes: The second apparatus sends the new to-be-trained data set to a third apparatus, so that the third apparatus trains the access frequency prediction model by using the new to-be-trained data set, to obtain the updated access frequency prediction model. The second apparatus receives the updated access frequency prediction model sent by the third apparatus. In an embodiment, after obtaining the new to-be-trained data set, the second apparatus may send the new to-be-trained data set to a third apparatus. The third apparatus trains the access frequency prediction model again by using the new to-be-trained data set, to obtain the trained access frequency prediction model.

In an embodiment, the method further includes: The second apparatus sends the updated access frequency prediction model to the first apparatus.

In an embodiment, that a feature length of the first feature changes includes that a quantity T of the historical time points changes, and/or a quantity L of the second data blocks adjacent to the first data block changes, where T is a positive integer, and L is a positive integer.

In an embodiment, that a second apparatus obtains access frequency of a first data block includes: The second apparatus obtains the first feature of the first data block, and sends the first feature of the first data block to the first apparatus. The second apparatus receives the access frequency, sent by the first apparatus, of the first data block. The access frequency of the first data block is obtained by the first apparatus by using the access frequency prediction model and the first feature.

A third aspect of embodiments of this application provides a method for training and generating an access frequency prediction model. The method includes: A third apparatus obtains a to-be-trained data set. The to-be-trained data set includes a plurality of to-be-trained features and labels corresponding to the plurality of to-be-trained features, and the labels are access frequency. Each of the plurality of to-be-trained features includes a read/write feature related to a to-be-trained data block and a read feature of a third data block adjacent to the to-be-trained data block. The to-be-trained data block is any data block in storage space. The third apparatus trains an initial network model by using the to-be-trained data set, to generate an access frequency prediction model.

In an embodiment, the to-be-trained feature includes a feature of the to-be-trained data block at each of T historical time points. There is a temporal-spatial correlation between read/write features of the to-be-trained data block at the T historical time points, and T is a positive integer.

In an embodiment, the access frequency prediction model includes a first submodel and a second submodel. The first submodel is used to extract a temporal feature of the to-be-trained feature, and the second submodel is used to extract a spatial feature of the to-be-trained feature.

In an embodiment, the access frequency prediction model further includes a third submodel. The third submodel is a model used to process a time sequence.

In an embodiment, the read/write feature related to the to-be-trained data block includes at least one of the following: a frequency feature of reading/writing the to-be-trained data block, a length feature of reading the to-be-trained data block, and an alignment feature of reading the to-be-trained data block.

In an embodiment, the read/write feature related to the to-be-trained data block includes at least one of the following: The frequency feature of reading/writing the to-be-trained data block includes at least one of the following: frequency at which all access interfaces read the to-be-trained data block, frequency at which all access interfaces write the to-be-trained data block, and total frequency at which all access interfaces read/write the to-be-trained data block; the length feature of reading the to-be-trained data block includes at least one of the following: a maximum read length, a minimum read length, or an average read length; and/or the alignment feature of reading the to-be-trained data block includes at least one of the following: a quantity of times of reading a first length, a quantity of times of reading a second length, and a proportion of the quantity of times of reading the first length to a total quantity of times of reading or a proportion of the quantity of times of reading the second length to the total quantity of times of reading. The first length indicates that a length is 2n, the second length indicates that a length is non-2n, and n is a positive integer.

In an embodiment, the read feature of the third data block adjacent to the to-be-trained data block includes at least read frequency features respectively corresponding to L third data blocks, and L is a positive integer.

In an embodiment, that a third apparatus obtains a to-be-trained data set includes: The third apparatus receives the to-be-trained data set sent by a second apparatus.

In an embodiment, the method further includes: The third apparatus sends the access frequency prediction model to a first apparatus.

In an embodiment, the method further includes: The third apparatus sends the access frequency prediction model to the second apparatus, so that the second apparatus forwards the access frequency prediction model to the first apparatus.

In an embodiment, the method further includes: The third apparatus receives a changed feature length and a new to-be-trained data set that are sent by the second apparatus. The third apparatus parses the new to-be-trained data set by using the changed feature length, to obtain a plurality of new to-be-trained features. The third apparatus trains the access frequency prediction model by using the plurality of new to-be-trained features and labels corresponding to the plurality of new to-be-trained features, to obtain the updated access frequency prediction model.

A fourth aspect of embodiments of this application provides a data processing apparatus. The apparatus includes a first obtaining unit, configured to obtain a first feature of a first data block, where the first data block is any data block in storage space, and the first feature includes a read/write feature related to the first data block and a read feature of a second data block adjacent to the first data block; and a processing unit, configured to input the first feature into an access frequency prediction model, to obtain access frequency, output by the access frequency prediction model, of the first data block. The access frequency of the first data block is used to determine a type of the first data block.

In an embodiment, the apparatus further includes a receiving unit, configured to receive the first feature, sent by a second apparatus, of the first data block. The first obtaining unit is configured to obtain the first feature received by the receiving unit.

In an embodiment, the apparatus further includes a sending unit, configured to send the access frequency of the first data block to the second apparatus.

In an embodiment, the type of the first data block is the cold data or the hot data.

In an embodiment, the processing unit is further configured to: when a feature length of the first feature changes, update the access frequency prediction model to obtain the updated access frequency prediction model.

In an embodiment, the first obtaining unit is further configured to obtain a second feature of the first data block. The feature length of the first feature is different from a feature length of the second feature. The processing unit is further configured to input the second feature into the updated access frequency prediction model, to obtain access frequency, output by the updated access frequency prediction model, of the first data block.

A fifth aspect of embodiments of this application provides a data processing apparatus. The apparatus further includes a second obtaining unit, configured to obtain access frequency of a first data block, where the access frequency of the first data block is obtained based on an access frequency prediction model and a first feature of the first data block, the first feature includes a read/write feature related to the first data block and a read feature of a second data block adjacent to the first data block, and the first data block is any data block in storage space; and a processing unit, configured to determine a type of each first data block in the storage space based on access frequency of each first data block.

In an embodiment, the processing unit is configured to: rank first data blocks based on access frequency of the first data blocks to obtain a ranking result, and determine types of the first data blocks in the storage space based on the ranking result.

In an embodiment of the data processing apparatus according to the fourth aspect or the fifth aspect of embodiments of this application, the first feature includes a feature of the first data block at each of T historical time points. There is a temporal-spatial correlation between read/write features of the first data block at the T historical time points, and T is a positive integer.

In an embodiment of the data processing apparatus according to the fourth aspect or the fifth aspect of embodiments of this application, the read/write feature related to the first data block includes at least one of the following: a frequency feature of reading/writing the first data block, a length feature of reading the first data block, and an alignment feature of reading the first data block.

In an embodiment of the data processing apparatus according to the fourth aspect or the fifth aspect of embodiments of this application, the read/write feature related to the first data block includes at least one of the following: The frequency feature of reading/writing the first data block includes at least one of the following: frequency at which all access interfaces read the first data block, frequency at which all access interfaces write the first data block, and total frequency at which all access interfaces read/write the first data block; the length feature of reading the first data block includes at least one of the following: a maximum read length, a minimum read length, or an average read length; and/or the alignment feature of reading the first data block includes at least one of the following: a quantity of times of reading a first length, a quantity of times of reading a second length, and a proportion of the quantity of times of reading the first length to a total quantity of times of reading or a proportion of the quantity of times of reading the second length to the total quantity of times of reading. The first length indicates that a length is 2n, the second length indicates that a length is non-2n, and n is a positive integer.

In an embodiment of the data processing apparatus according to the fourth aspect or the fifth aspect of embodiments of this application, the read feature of the second data block adjacent to the first data block includes at least read frequency features respectively corresponding to L second data blocks, and L is a positive integer.

In an embodiment of the data processing apparatus according to the fourth aspect or the fifth aspect of embodiments of this application, the access frequency prediction model includes a first submodel and a second submodel. The first submodel is used to extract a temporal feature of the first feature, and the second submodel is used to extract a spatial feature of the first feature.

In an embodiment of the data processing apparatus according to the fourth aspect or the fifth aspect of embodiments of this application, the access frequency prediction model further includes a third submodel. The third submodel is used to obtain a feature scale of the first feature.

In an embodiment of the data processing apparatus according to the fourth aspect or the fifth aspect of embodiments of this application, the access frequency prediction model is generated through training based on to-be-trained features and labels corresponding to the to-be-trained features. The labels corresponding to the to-be-trained features are the access frequency.

In an embodiment, the apparatus further includes a third obtaining unit, configured to: when the feature length of the first feature changes, obtain a new to-be-trained data set. The new to-be-trained data set includes a plurality of to-be-trained features and labels corresponding to the plurality of to-be-trained features. The new to-be-trained data set is used to train the access frequency prediction model, to obtain the updated access frequency prediction model.

In an embodiment, the apparatus further includes a sending unit, configured to send the new to-be-trained data set to a third apparatus, so that the third apparatus trains the access frequency prediction model by using the new to-be-trained data set, to obtain the updated access frequency prediction model; and a receiving unit, configured to receive the updated access frequency prediction model sent by the third apparatus.

In an embodiment, the apparatus further includes a sending unit, configured to send the updated access frequency prediction model to the first apparatus.

In an embodiment, that a feature length of the first feature changes includes that a quantity T of the historical time points changes, and/or a quantity L of the second data blocks adjacent to the first data block changes, where T is a positive integer, and L is a positive integer.

In an embodiment, the apparatus further includes a receiving unit and a sending unit. The second obtaining unit is configured to obtain the first feature of the first data block. The sending unit is configured to send the first feature of the first data block to the first apparatus. The receiving unit is configured to receive the access frequency, sent by the first apparatus, of the first data block. The access frequency of the first data block is obtained by the first apparatus by using the access frequency prediction model and the first feature.

A sixth aspect of embodiments of this application provides an apparatus for training and generating an access frequency prediction model. The apparatus includes a fourth obtaining unit, configured to obtain a to-be-trained data set, where the to-be-trained data set includes a plurality of to-be-trained features and labels corresponding to the plurality of to-be-trained features, the labels are access frequency, each of the plurality of to-be-trained features includes a read/write feature related to a to-be-trained data block and a read feature of a third data block adjacent to the to-be-trained data block, and the to-be-trained data block is any data block in storage space; and a generation unit, configured to train an initial network model by using the to-be-trained data set, to generate an access frequency prediction model.

In an embodiment, the to-be-trained feature includes a feature of the to-be-trained data block at each of T historical time points. There is a temporal-spatial correlation between read/write features of the to-be-trained data block at the T historical time points, and T is a positive integer.

In an embodiment, the access frequency prediction model includes a first submodel and a second submodel. The first submodel is used to extract a temporal feature of the to-be-trained feature, and the second submodel is used to extract a spatial feature of the to-be-trained feature.

In an embodiment, the access frequency prediction model further includes a third submodel. The third submodel is a model used to process a time sequence.

In an embodiment, the read/write feature related to the to-be-trained data block includes at least one of the following: a frequency feature of reading/writing the to-be-trained data block, a length feature of reading the to-be-trained data block, and an alignment feature of reading the to-be-trained data block.

In an embodiment, the read/write feature related to the to-be-trained data block includes at least one of the following: The frequency feature of reading/writing the to-be-trained data block includes at least one of the following: frequency at which one or more access interfaces read the to-be-trained data block, frequency at which the one or more access interfaces write the to-be-trained data block, and total frequency at which the one or more access interfaces read/write the to-be-trained data block; the length feature of reading the to-be-trained data block includes at least one of the following: a maximum read length, a minimum read length, or an average read length; and/or the alignment feature of reading the to-be-trained data block includes at least one of the following: a quantity of times of reading a first length, a quantity of times of reading a second length, and a proportion of the quantity of times of reading the first length to a total quantity of times of reading or a proportion of the quantity of times of reading the second length to the total quantity of times of reading. The first length indicates that a length is 2n, the second length indicates that a length is non-2n, and n is a positive integer.

In an embodiment, the read feature of the third data block adjacent to the to-be-trained data block includes at least read frequency features respectively corresponding to L third data blocks, and L is a positive integer.

In an embodiment, the fourth obtaining unit is configured to receive the to-be-trained data set sent by a second apparatus.

In an embodiment, the apparatus further includes a sending unit, configured to send the access frequency prediction model to a first apparatus.

In an embodiment, the apparatus further includes a sending unit, configured to send the access frequency prediction model to the second apparatus, so that the second apparatus forwards the access frequency prediction model to the first apparatus.

In an embodiment, the apparatus further includes a receiving unit, configured to receive a changed feature length and a new to-be-trained data set that are sent by the second apparatus. The third apparatus parses the new to-be-trained data set by using the changed feature length, to obtain a plurality of new to-be-trained features. The generation unit is further configured to train the access frequency prediction model by using the plurality of new to-be-trained features and labels corresponding to the plurality of new to-be-trained features, to obtain the updated access frequency prediction model.

A seventh aspect of embodiments of this application provides a data processing system. The system includes a first apparatus and a second apparatus. The first apparatus is configured to perform the data processing method according to the first aspect. The second apparatus is configured to perform the data processing method according to the second aspect.

In an embodiment, the system further includes a third apparatus.

The third apparatus is configured to: perform the method according to the third aspect, and train an access frequency prediction model.

An eighth aspect of embodiments of this application provides a data processing apparatus, including a processor coupled to a memory. The processor is configured to execute computer instructions in the memory, to enable the apparatus to perform the method according to any possible implementation of the first aspect, any possible implementation of the second aspect, or any possible implementation of the third aspect.

A ninth aspect of embodiments of this application provides a computer-readable storage medium, including instructions. When the instructions are run on a computer, the computer is enabled to perform the method according to any one of the first aspect or the possible implementations of the first aspect, any one of the second aspect or the possible implementations of the second aspect, or any one of the third aspect or the possible implementations of the third aspect.

A tenth aspect of embodiments of this application provides a computer program product. When the computer program product is run on a device, the device is enabled to perform the method according to any one of the first aspect or the possible implementations of the first aspect, any one of the second aspect or the possible implementations of the second aspect, or any one of the third aspect or the possible implementations of the third aspect.

An eleventh aspect of embodiments of this application provides a first apparatus, including a processor. The processor is configured to execute a computer program (or computer-executable instructions) stored in a memory. When the computer program (or the computer-executable instructions) is/are executed, the apparatus is enabled to perform the method according to the first aspect and possible implementations of the first aspect.

In an embodiment, the processor and the memory are integrated together.

In an embodiment, the memory is located outside the first apparatus.

The first apparatus further includes a communication interface. The communication interface is configured for communication, for example, data and/or signal sending or receiving, between the first apparatus and another device. For example, the communication interface may be a transceiver, a circuit, a bus, a module, or another type of communication interface.

A twelfth aspect of embodiments of this application further provides a second apparatus, including a processor. The processor is configured to execute a computer program (or computer-executable instructions) stored in a memory. When the computer program (or the computer-executable instructions) is/are executed, the apparatus is enabled to perform the method according to the second aspect and possible implementations of the second aspect.

In an embodiment, the processor and the memory are integrated together.

In an embodiment, the memory is located outside the second apparatus.

The second apparatus further includes a communication interface. The communication interface is configured for communication, for example, data and/or signal sending or receiving, between the second apparatus and another device. For example, the communication interface may be a transceiver, a circuit, a bus, a module, or another type of communication interface.

A thirteenth aspect of embodiments of this application provides a third apparatus, including a processor. The processor is configured to execute a computer program (or computer-executable instructions) stored in a memory. When the computer program (or the computer-executable instructions) is/are executed, the apparatus is enabled to perform the method according to the third aspect and possible implementations of the third aspect.

In an embodiment, the processor and the memory are integrated together.

In an embodiment, the memory is located outside the third apparatus.

The third apparatus further includes a communication interface. The communication interface is configured for communication, for example, data and/or signal sending or receiving, between the third apparatus and another device. For example, the communication interface may be a transceiver, a circuit, a bus, a module, or another type of communication interface.

A fourteenth aspect of embodiments of this application further provides a chip system. The chip system includes a processor and may further include a memory, to implement the method according to any one of the first aspect or the possible implementations of the first aspect, any one of the second aspect or the possible implementations of the second aspect, or any one of the third aspect or the possible implementations of the third aspect. The chip system may include a chip, or may include a chip and another discrete component.

According to the technical solutions provided in embodiment of this application, the access frequency prediction model is generated through pre-training. The first apparatus obtains the first feature of each data block in the storage space, that is, the first feature of the first data block. The first feature includes the read/write feature related to the first data block and the read feature of the second data block adjacent to the first data block. The first apparatus inputs the first feature of the first data block into the access frequency prediction model, and obtains the access frequency corresponding to the first data block at the future moment. The access frequency corresponding to the first data block is used to determine the type of the first data block. For example, whether the first data block is the cold data or the hot data is determined based on the access frequency corresponding to the first data block. To be specific, in embodiments of this application, a multidimensional feature of the first data block (the read/write feature of the first data block and a read feature of an adjacent data block) is obtained, so that the future access frequency of the first data block is predicted by using the multidimensional feature. Prediction accuracy is improved, and the type of the first data block may be further determined based on the access frequency of the first data block. Therefore, corresponding processing is performed on the first data block. In this way, use performance of a storage system is improved.

BRIEF DESCRIPTION OF DRAWINGS

To describe the technical solutions in embodiments of this application more clearly, the following briefly describes accompanying drawings used in describing embodiments. It is clear that the accompanying drawings in the following description show merely some embodiments of this application, and persons of ordinary skill in the art may further derive other accompanying drawings from these accompanying drawings without creative efforts.

DESCRIPTION OF EMBODIMENTS

To make persons skilled in the art understand the technical solutions in this application better, the following clearly and completely describes the technical solutions in embodiments of this application with reference to the accompanying drawings in embodiments of this application.

With development of technologies such as big data and cloud computing, to achieve storage, utilization, computing, and analysis of massive data, a conventional practice is to provide a dozen of different database products to meet corresponding requirements. However, as a data amount and data types increase, the overall maintenance and data consistency management costs increase greatly, affecting use of an entire system.

Figure 1:
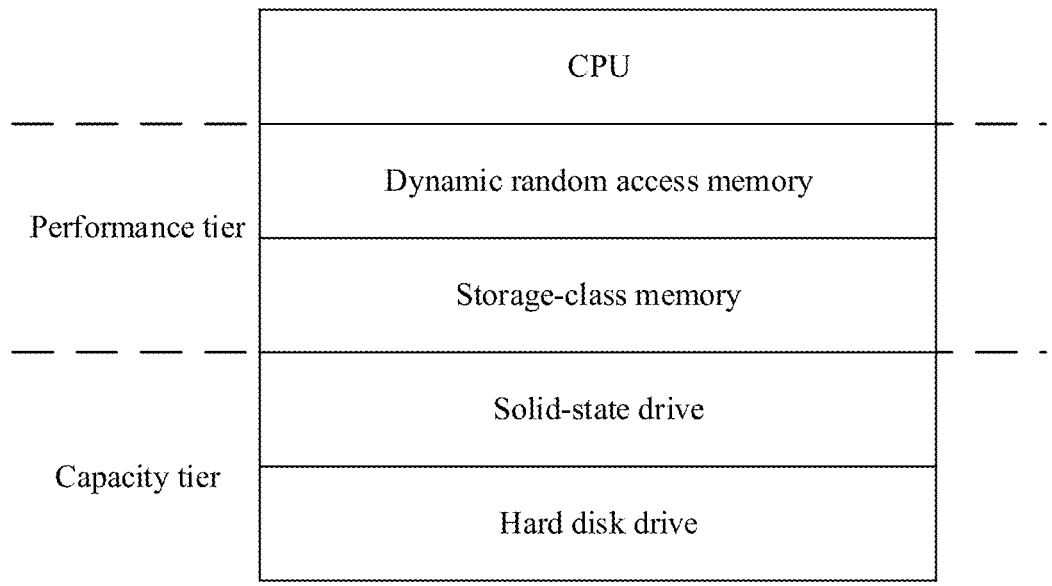
FIG. 1 is a diagram of a memory hierarchy structure according to an embodiment of this application.

To resolve a data storage problem, a storage mode, that is, multi-mode intelligent storage, is provided. In this mode, data is accurately stored in a proper medium based on factors such as value and a life cycle of service data, to optimize data access efficiency. Data mobility is a key technology of the multi-mode intelligent storage, and supports management and scheduling of a data mobility task at a same tier or across tiers, to implement efficient data mobility. Hot and cold data identification is an important part of the data mobility. Stored data is identified, and a data mobility solution is determined based on an identification result. In this way, the hot data is stored in a performance tier as much as possible, and the cold data is stored in a capacity tier. Use efficiency of a storage medium is improved. The performance tier is a storage tier close to a top tier in a storage device, and a transmission rate of the storage tier is high. The capacity tier is a storage tier close to a bottom tier in a memory, and a transmission rate of the storage tier is low. As shown in FIG. 1, in a storage hierarchy structure, storage space close to a central processing unit (CPU) is used as a performance tier, and storage space distant away from the CPU is used as a capacity tier. Therefore, how to accurately identify data types, process different types of data, and improve performance of a storage system is a key to implementing the multi-mode intelligent storage. Currently, the following several solutions are provided for identifying a data type. One solution is to predict data access frequency in an exponential smoothing manner. However, in this solution, only short-term access frequency can be accurately predicted, and long-term access frequency cannot be accurately predicted. One solution is to predict data access frequency by using a Markov chain. In this solution, stationary distribution of states can be learned, and a hierarchical structure is used to reduce a scale of a transition probability matrix. However, due to a limitation of a Markov assumption, a state space explosion occurs, a model is difficult to converge and is complex. One solution is to predict data access frequency by using a generative adversarial network. In this solution, feature distribution can be learned, and the access frequency can be predicted. However, a model is complex and is difficult to converge, and an inference delay is high. Another solution is to classify data by using a clustering model and a neural network model. In this solution, clustering may be performed based on a feature of address space, and modeling may be performed for each cluster, to reduce a size of the neural network model. However, an address coverage rate is low, and a prediction granularity is large. It can be learned that a conventional method for identifying a data type has various problems, for example, long-term prediction accuracy cannot be ensured, model complexity is high, and a prediction delay is long.

In view of this, embodiments of this application provides a data processing method. Data types are identified by using a neural network model, and different processing is performed based on the data types. This improves identification accuracy, and also improves data processing performance of a system. For example, an access frequency prediction model is pre-trained. When data in storage space needs to be processed, a first feature of each data block (a first data block) in the storage space is obtained. The first feature includes a read/write feature related to the first data block and a read feature of a second data block adjacent to the first data block. The obtained first feature is input into the access frequency prediction model, to obtain access frequency of the first data block. In this way, a type of the first data block is determined based on the access frequency of the first data block, and matching is performed. It can be learned that a multidimensional feature related to the first data block is obtained, to predict the future access frequency of the first data block by using the multidimensional feature. Prediction accuracy is improved. In addition, the type of the first data block is determined based on the access frequency of the first data block, and corresponding processing is performed on the first data block. Processing performance of a system is improved.

Value of data is how frequent the data is queried or updated. In different service systems, a user has different requirements for different data. For example, in a traffic popularity analysis system of an Internet database, some data blocks recorded in the system are critical to analysis, and the system queries the data blocks frequently. Other data blocks are not critical to analysis, and the system queries the data blocks infrequently. To facilitate quick query of the system, the data blocks frequently queried need to be stored in the performance tier, and the data blocks infrequently queried need to be stored in the capacity tier. Therefore, the method provided in embodiments of this application may be used to obtain first features of data blocks stored in the system, input the first features of the data blocks into the access frequency prediction model, and obtain access frequency of the data blocks by using the access frequency prediction model. After the access frequency of the data blocks is obtained, storage locations of the data blocks are determined based on values of the access frequency.

For ease of understanding of the solutions provided in embodiments of this application, the following provides descriptions with reference to the accompanying drawings.

Figure 2:
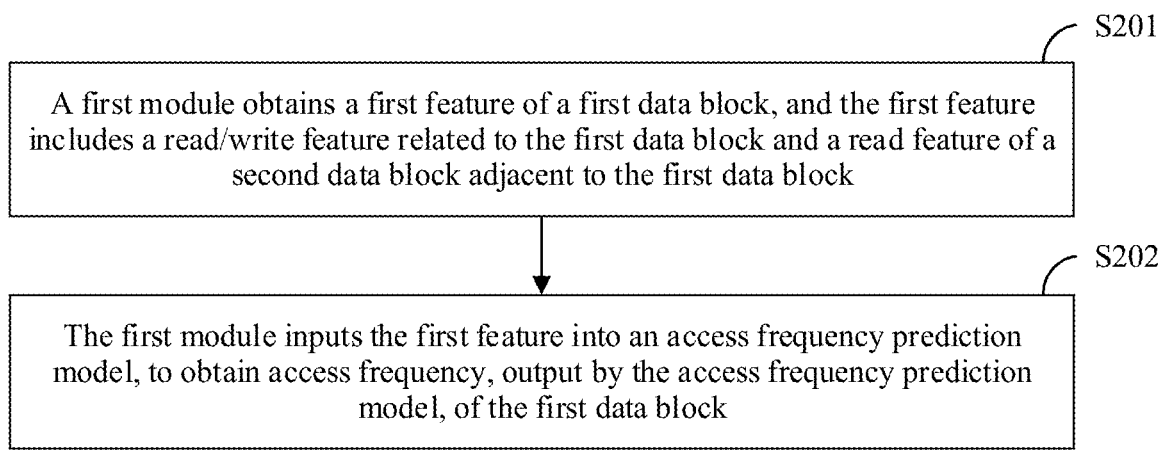
FIG. 2 is a flowchart of a data processing method according to an embodiment of this application.

FIG. 2 is a flowchart of a data processing method according to an embodiment of this application. As shown in FIG. 2, the method includes:

S201: A first apparatus obtains a first feature of a first data block.

In an embodiment, for any data block in storage space, to obtain access frequency of the data block (the first data block) within future time, the first feature of the first data block is obtained. The first feature includes a read/write feature related to the first data block and a read feature of a second data block adjacent to the first data block. In other words, the first feature includes a feature related to the first data block, and also includes a feature of an adjacent data block, to reflect a feature of the first data block in a multidimensional manner.

The read/write feature related to the first data block includes one or more of the following: a frequency feature of reading/writing the first data block, a length feature of reading the first data block, and an alignment feature of reading the first data block. The frequency feature of reading/writing the first data block includes but is not limited to the following: frequency at which one or more access interfaces read the first data block, frequency at which the one or more access interfaces write the first data block, and total frequency at which the one or more access interfaces read/write the first data block.

In an embodiment, frequency at which all access interfaces write the first data block is frequency of adding data to the first data block, deleting data from the first data block, and modifying data in the first data block. For example, frequency at which all access interfaces read the first data block is x, frequency at which all access interfaces write the first data block is y, and total frequency at which all access interfaces read/write the first data block is x+y.

In an embodiment, the length feature of reading the first data block includes but is not limited to a maximum read length, a minimum read length, and an average read length.

In an embodiment, the alignment feature of reading the first data block includes but is not limited to a quantity of times of reading a first length, a quantity of times of reading a second length, a proportion of the quantity of times of reading the first length to a total quantity of times of reading, and a proportion of the quantity of times of reading the second length to the total quantity of times of reading. The first length indicates that a length is 2n, the second length indicates that a length is non-2n, and n is a positive integer.

Figure 3A:
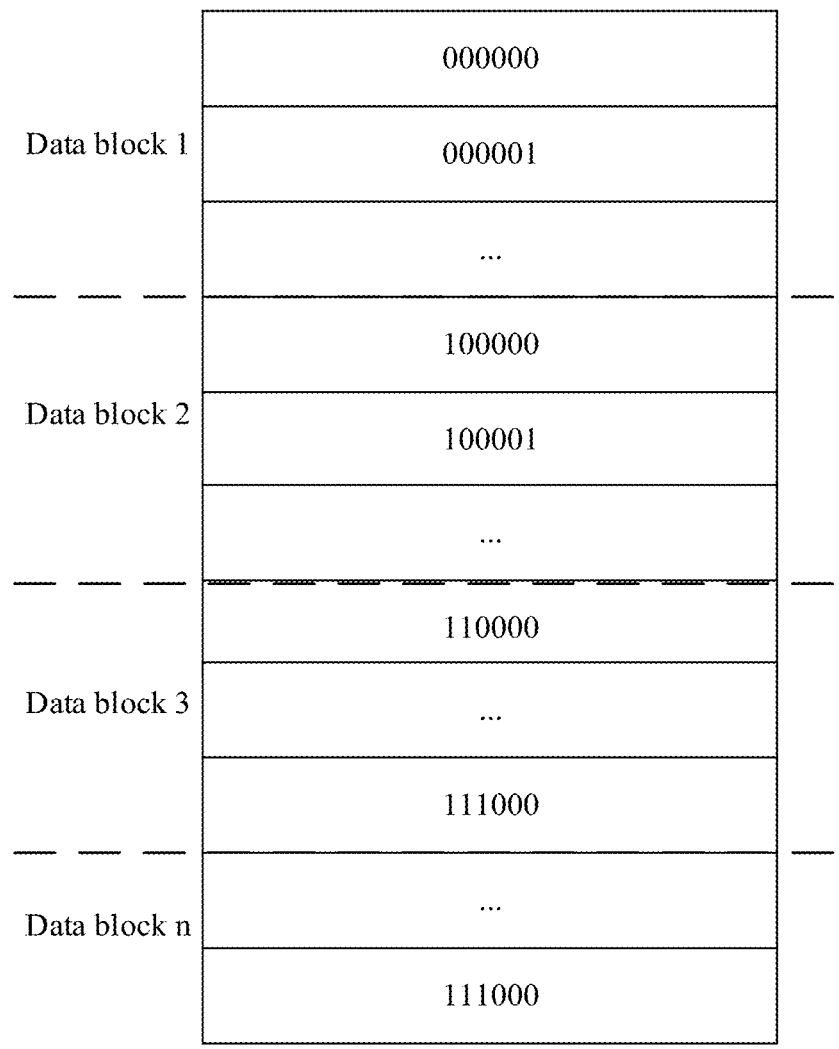
FIG. 3a is a schematic diagram of data block storage according to an embodiment of this application.

The read feature of the second data block adjacent to the first data block includes at least read frequency features respectively corresponding to L second data blocks, and L is a positive integer. The L second data blocks may be L/2 second data blocks selected before the first data block and L/2 second data blocks selected after the first data block. When L/2 is not an integer, the value may be rounded up. The second data block adjacent to the first data block may include a second data block directly adjacent to the first data block, and may also include a second data block indirectly adjacent to the first data block. The data block may be data stored between two storage addresses in the storage space. Generally, the storage space may be divided into a plurality of data blocks. For example, as shown in FIG. 3a, a storage device is divided into a plurality of storage space, where an address 000000-011111 is used to store a data block 1, an address 100000-101111 is used to store a data block 2, an address 110000 to 111000 is used to store a data block 3, and the like. The first data block may be the data block 2, and the second data blocks are the data block 1 and the data block 3.

It should be noted that an access status of the first data block is time-related. To improve prediction accuracy, the first feature may include a feature of the first data block at each of T historical time points. There is a temporal-spatial correlation between read/write frequency features of the first data block at the T historical time points, and T is a positive integer. The T historical time points are time before a current time point at which prediction is performed. That there is a temporal correlation between read/write frequency features of the first data block at the T historical time points means that read/write features at different time points are correlated. A correlation between different time points may be that read/write frequency at two time points change in a same direction. For example, if the first data block is read at a time point t1, the first data block is also read at a time point t2, where the time point t2 is later than the time point t1. Alternatively, a correlation between different time points is that read/write frequency at two time points change in opposite directions. For example, if the first data block is read at a time point t1, the first data block is not read at a time point t2, where the time point t2 is later than the time point t1. That there is a spatial correlation between read/write frequency features of the first data block at the T historical time points means that the read/write frequency of the first data block and the read/write frequency of the second data block depend on each other at each historical time point. For example, when the second data block is read and analyzed, the first data block is first obtained before the second data block is analyzed. In this case, the read frequency of the first data block is affected by the read frequency of the second data block.

It can be learned from the foregoing that, for a given time point, a feature length corresponding to the first data block at the time point may be (10+L), and feature lengths corresponding to T time points are N=T*(10+L). Ten is a quantity of read/write features related to the first data block, for example, three frequency features of reading/writing the first data block, three length features of reading the first data block, and four alignment features of reading the first data block.

It should be noted that, at different time points, a quantity of correlated historical time points may change, that is, a value of T changes. Similarly, at different time points, a quantity of correlated adjacent data blocks may also change, that is, a value of L also changes. Therefore, a length of the first feature corresponding to the first data block also keeps changing. For example, a first correlation coefficient between the read/write frequency of the first data block at different time points may be obtained by using an autocorrelation function, and T is determined based on the first correlation coefficient. Alternatively, a second correlation coefficient between the read/write frequency of the first data block and the read/write frequency of the second data block may be obtained by using a covariance function, and L is determined based on the second correlation coefficient.

S202: The first apparatus inputs the first feature into an access frequency prediction model, to obtain access frequency, output by the access frequency prediction model, of the first data block.

After obtaining the first feature of the first data block, the first apparatus inputs the first feature into the access frequency prediction model. In this way, the access frequency of the first data block is obtained by using the access frequency prediction model. The access frequency of the first data block is read frequency of the first data block, and may be used to determine a type of the first data block. The type of the first data block may be the cold data or the hot data, or the type of the first data block may be junk data, non-junk data, or the like. The junk data may be data that does not affect normal running of a system in a current application scenario, and is set based on a requirement of an actual application scenario. For example, if the system only needs to query data of a current year, data of a last year and earlier is referred to as the junk data. Alternatively, if some functions are deleted after the system is upgraded or reconstructed, some tables related to the functions may not be used anymore. In this case, data of some tables is referred to as the junk data. The access frequency prediction model is generated through training based on to-be-trained features and labels corresponding to the to-be-trained features. The labels corresponding to the to-be-trained features are access frequency.

In an embodiment, when the first apparatus has a data processing function, when obtaining access frequency of each first data block, the first apparatus may determine a type of each first data block based on the access frequency of each first data block. In this way, a matching operation is performed on data blocks of different types. For example, a first data block which is the hot data is moved to a performance tier of the memory, and a first data block which is the cold data is moved to a capacity tier of the memory.

In an embodiment, that the first apparatus determines a type of each first data block based on the access frequency of each data block may include: The first apparatus ranks first data blocks in descending order of access frequency, and determines first K first data blocks as the hot data and the remaining first data blocks as the cold data. Alternatively, the first apparatus determines a first data block whose access frequency is greater than or equal to an access frequency threshold as the hot data, and determines a first data block whose access frequency is less than the access frequency threshold as the cold data.

In an embodiment, after obtaining the access frequency of the first data block, the first apparatus may further determine, based on the access frequency of the first data block, whether the first data block is the junk data, and recycle the first data block if the first data block is the junk data. Alternatively, the first apparatus performs defragmentation processing based on the access frequency of each first data block. Defragmentation processing means to rearrange, by using system software or professional defragmentation software, fragmented data generated in a long-term use process of a storage device, so that related data has continuous sectors. In this way, storage performance and a data read speed are improved. Alternatively, the first apparatus determines, based on the access frequency of the first data block, whether to prefetch the first data block. Prefetching means that required data is loaded to a storage tier closer to a CPU before the CPU is used, so that the data can be obtained in a timely manner when the data is actually needed, thereby reducing a delay.

Figure 3B:
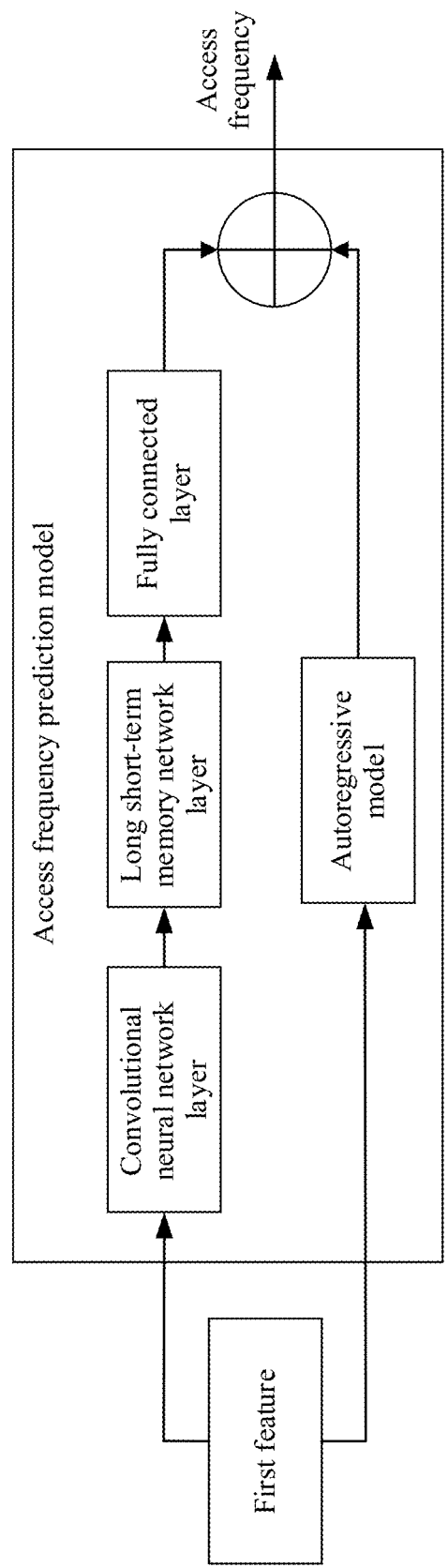
FIG. 3b is a diagram of a structure of an access frequency prediction model according to an embodiment of this application.

It can be learned from the foregoing that, the first feature may include the read/write features of the first data block at different time points, and may also include the read feature of the second data block. Therefore, the access frequency prediction model may extract a temporal/spatial correlation between different features in the first feature. For example, the access frequency prediction model may include a first submodel and a second submodel. The first submodel is used to extract a temporal feature of the first feature, and the second submodel is used to extract a spatial feature of the first feature. For example, the first submodel is a convolutional neural network (CNN) model, and the second submodel is a long short-term memory (LSTM) network. In addition, a neural network is insensitive to an input scale. Therefore, to resolve a scale insensitive problem, the access frequency prediction model may further include a third submodel, and the third submodel is used to obtain a feature scale of the first feature. For example, the third submodel is an autoregressive model. The feature scale of the first feature is a scale of a dimension of each feature in the first feature. For a structure of the access frequency prediction model, refer to FIG. 3b. The model includes a CNN layer, an LSTM layer, a fully-connected layer, and an autoregressive layer. A function of the fully-connected layer is to combine first features obtained through learning of the foregoing layers, to determine the access frequency of the first data block.

In an embodiment, when the feature length of the first feature changes, to ensure prediction accuracy, the access frequency prediction model needs to be trained again, to obtain the updated access frequency prediction model. In other words, the access frequency prediction model is trained based on new to-be-trained features and the new to-be-trained features. A length of the new to-be-trained feature is a changed feature length. After obtaining the updated access frequency prediction model, the first apparatus obtains a second feature of the first data block. A feature length of the second feature is different from the feature length of the first feature. The first apparatus inputs the second feature into the updated access frequency prediction model, to obtain access frequency, output by the updated access frequency prediction model, of the first data block. A feature type included in the second feature may be consistent with a feature type included in the first feature. However, feature lengths of the second feature and the first feature are different. That a feature length of the first feature changes includes that a quantity T of the historical time points changes, and/or a quantity L of the adjacent second data blocks changes. In a another possible, to avoid resource overheads caused by frequent training, the access frequency prediction model is generally trained again when a change amount of T or L is greater than a preset threshold. The preset threshold corresponding to the change amount of T and the preset threshold corresponding to the change amount of L may be set based on an actual requirement.

A multidimensional feature related to the first data block is obtained, to predict the future access frequency of the first data block by using the multidimensional feature. Prediction accuracy is improved. In addition, the type of the first data block is determined based on the access frequency of the first data block, and corresponding processing is performed on the first data block. Processing performance of a system is improved.

In an embodiment, when the first apparatus has a capability of obtaining the first feature of the first data block, the first apparatus may collect the first feature of the first data block. The first apparatus may also receive the first feature, sent by a second apparatus, of the first data block. The second apparatus has a capability of obtaining the first feature of the first data block. For example, the second apparatus is a host. The host stores a large amount of data. The first apparatus is a device that has a capability of training the access frequency prediction model and predicting the access frequency based on the input first feature by using the access frequency prediction model. Further, after obtaining the access frequency of the first data block, the first apparatus may send the access frequency of the first data block to the second apparatus. The second apparatus performs a related operation based on the access frequency of the first data block.

For ease of understanding, the following describes an interaction process between the first apparatus and the second apparatus with reference to the accompanying drawings.

Figure 4:
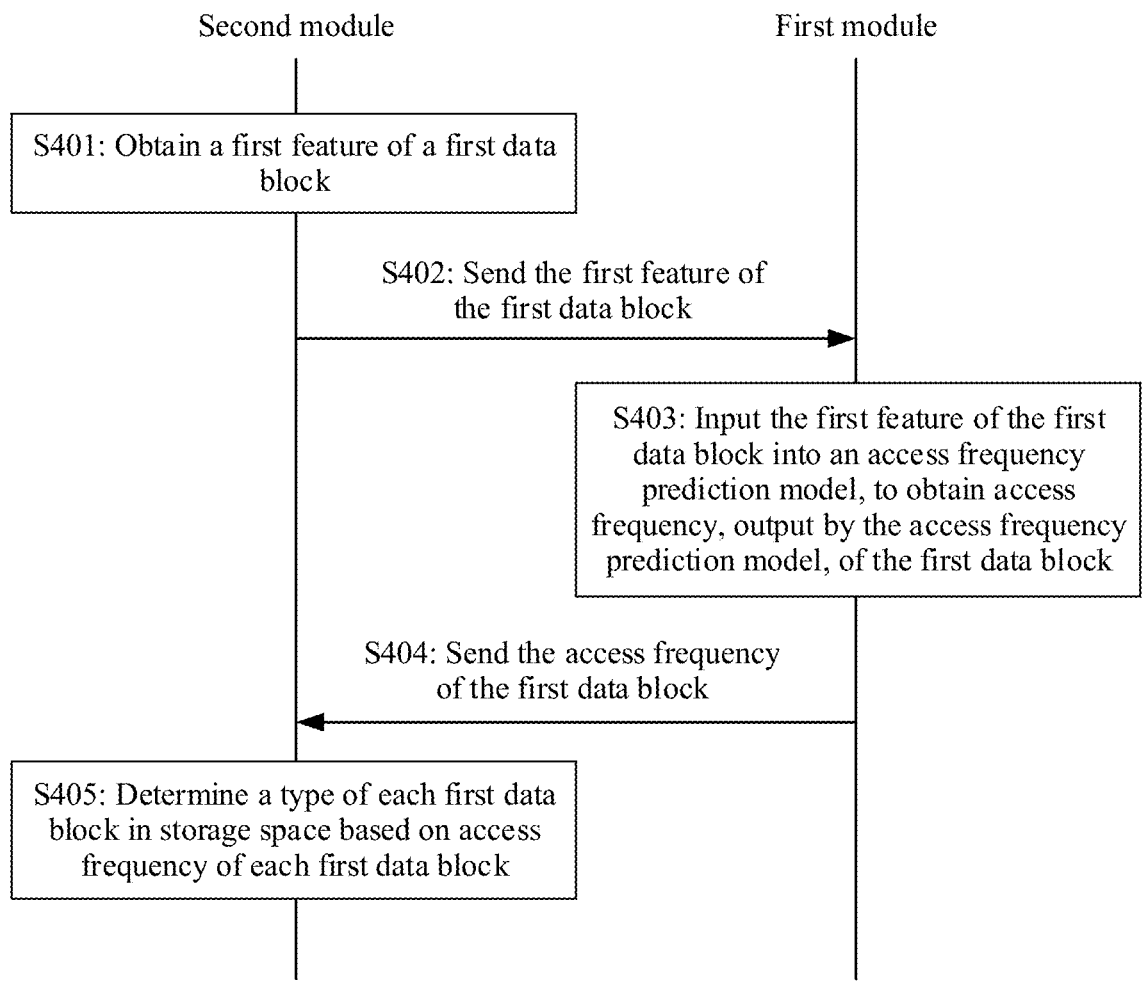
FIG. 4 is a flowchart of another data processing method according to an embodiment of this application.

FIG. 4 is a flowchart of data processing interaction according to an embodiment of this application. As shown in FIG. 4, the method may include the following operations.

S401: A second apparatus obtains a first feature of a first data block.

In an embodiment, the second apparatus is responsible for collecting a first feature of each first data block in storage space. The first feature includes a read/write feature related to the first data block and a read feature of a second data block adjacent to the first data block. For descriptions of the first feature, refer to related descriptions of the first feature in S201. Details are not described herein again in an embodiment.

S402: The second apparatus sends the first feature of the first data block to the first apparatus. Correspondingly, the first apparatus receives a first feature value, sent by the second apparatus, of the first data block.

In an embodiment, after the second apparatus collects the first feature of the first data block, the second apparatus sends the first feature of the first data block to the first apparatus. In this way, the first apparatus predicts access frequency of the first data block.

S403: The first apparatus inputs the first feature into an access frequency prediction model, to obtain the access frequency, output by the access frequency prediction model, of the first data block.

After obtaining the first feature of the first data block, the first apparatus inputs the first feature into the stored access frequency prediction model. In this way, the access frequency of the first data block at a future moment is obtained by using the access frequency prediction model. For implementation of obtaining, by the first apparatus, the access frequency of the first data block by using the access frequency prediction model, refer to related descriptions of S202. Details are not described herein again in an embodiment.

The access frequency prediction model is generated through training based on to-be-trained features and labels corresponding to the to-be-trained features. The labels corresponding to the to-be-trained features are access frequency. The access frequency prediction model in the first apparatus may be generated by the first apparatus through training, or may be generated by the second apparatus through training and sent to the first apparatus. When the first apparatus does not have a data collection capability, the to-be-trained features used by the first apparatus to train and generate the access frequency prediction model and the labels corresponding to the to-be-trained features are also sent by the second apparatus.

In an embodiment, the second apparatus may monitor a change of a feature length of the first feature. When monitoring the change of the feature length of the first feature, the second apparatus obtains a new to-be-trained data set. The new to-be-trained data set includes a plurality of to-be-trained features and labels corresponding to the plurality of to-be-trained features. The new to-be-trained data set is used to train the access frequency prediction model, to obtain the updated access frequency prediction model. For example, the second apparatus may train the access frequency model by using the new to-be-trained data set, to obtain the updated access frequency prediction model, and send the updated access frequency prediction model to the first sending apparatus. Correspondingly, the first apparatus receives the updated access frequency prediction model sent by the second apparatus. Alternatively, the second apparatus sends the new to-be-trained data set to the first apparatus. Correspondingly, the first apparatus receives the new to-be-trained data set sent by the second apparatus, and trains the access frequency model by using the new to-be-trained data set, to obtain the updated access frequency prediction model. The change of the feature length of the first feature includes that a quantity T of the historical time points changes, and/or a quantity L of the second data blocks adjacent to the first data block changes. T and L are positive integers. In another possible, to avoid resource overheads caused by frequent training, the access frequency prediction model is generally trained again when a change amount of T or L is greater than a preset threshold. The preset threshold corresponding to the change amount of T and the preset threshold corresponding to the change amount of L may be set based on an actual requirement.

Further, when the second apparatus monitors a change of the feature length of the first feature, prediction accuracy may be reduced if the access frequency prediction model of a current version is still used to predict the access frequency. In an embodiment, when the second apparatus monitors the change of the feature length of the first feature, the second apparatus sends an interrupt signal to the first apparatus. Correspondingly, the first apparatus receives the interrupt signal sent by the second apparatus. After the first apparatus receives the interrupt signal, the first apparatus no longer predicts the access frequency of the first data block by using the current access frequency prediction model. After obtaining the updated access frequency prediction model, the first apparatus obtains a second feature of the first data block, and inputs the second feature into the updated access frequency prediction model, to predict the access frequency of the first data block. In this way, prediction accuracy is ensured. A length of the second feature is a changed feature length, and is different from the length of the first feature.

S404: The first apparatus sends the access frequency of the first data block to the second apparatus. Correspondingly, the second apparatus receives the access frequency, sent by the first apparatus, of the first data block.

S405: The second apparatus determines a type of each first data block in the storage space based on access frequency of each first data block.

For the first data block in the storage space, after obtaining the access frequency of the first data block, the first apparatus sends the access frequency of the first data block to the second apparatus. Correspondingly, the second apparatus receives the access frequency, sent by the first apparatus, of the first data block. After obtaining the access frequency of each first data block in the storage space, the second apparatus may determine the type of each first data block in the storage space based on the access frequency of each first data block. The type of the first data block may include the hot data or the cold data, or may be junk data or non-junk data.

Further, after obtaining the access frequency of the first data block, the second apparatus may further perform another processing operation, for example, determine, based on the access frequency of the first data block, whether to perform a prefetch operation on the data block, or perform a defragmentation operation based on the access frequency of each first data block.

For implementation of S405 in an embodiment, refer to related descriptions in the method embodiment shown in FIG. 2. Details are not described herein again in an embodiment.

In some application scenarios, a device for training and generating the access frequency prediction model may also be performed by a third apparatus. After the third apparatus generates the access frequency prediction model through training, the third apparatus is sent to the first apparatus. It should be noted that the first apparatus, the second apparatus, and the third apparatus may be independent devices, or may be different functional modules on a same device. For example forms of the foregoing three modules are not limited in an embodiment. For ease of understanding, the following provides descriptions with reference to the accompanying drawings.

Figure 5:
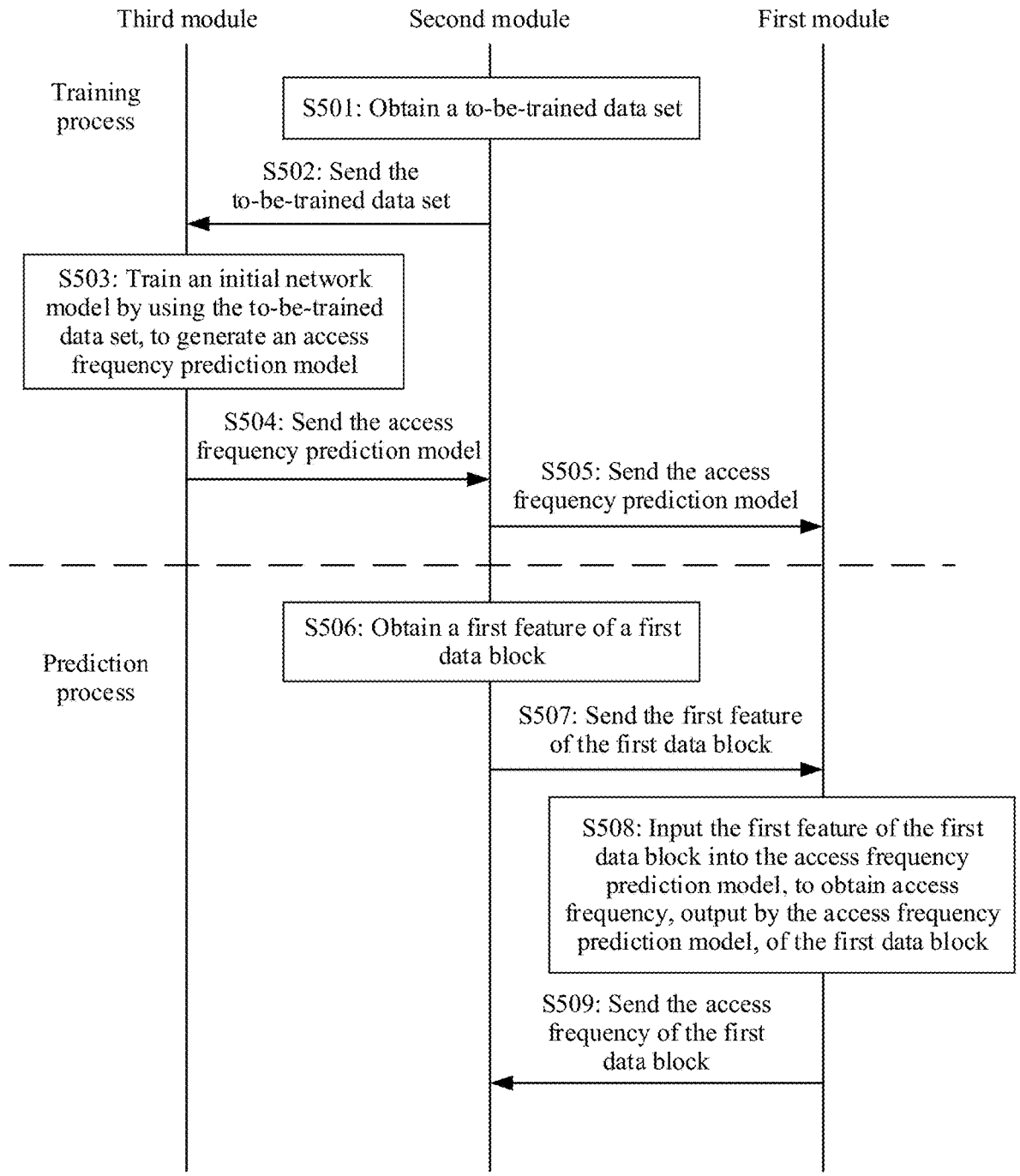
FIG. 5 is a flowchart of still another data processing method according to an embodiment of this application.

FIG. 5 is a diagram of interaction of a data processing method according to an embodiment of this application. As shown in FIG. 5, the method may include the following operations.

S501: A second apparatus obtains a to-be-trained data set.

In an embodiment, the second apparatus is responsible for constructing the to-be-trained data set. The to-be-trained data set may include a plurality of to-be-trained features and labels corresponding to the plurality of to-be-trained features. The labels may be access frequency. Each of the plurality of to-be-trained features includes a read/write feature related to a to-be-trained data block and a read feature of a third data block adjacent to the to-be-trained data block. The to-be-trained data block may be any data block in storage space.

The read/write feature related to the to-be-trained data block includes but is not limited to the following: a frequency feature of reading/writing the to-be-trained data block, a length feature of reading the data block, and an alignment feature of reading the to-be-trained data block. The frequency feature of reading/writing the to-be-trained data block includes but is not limited to the following: frequency at which one or more access interfaces read the to-be-trained data block, frequency at which the one or more access interfaces write the to-be-trained data block, and total frequency at which the one or more access interfaces read/write the to-be-trained data block. The length feature of reading the to-be-trained data block includes but is not limited to a maximum read length, a minimum read length, or an average read length. The alignment feature of reading the to-be-trained data block includes but is not limited to a quantity of times of reading a first length, a quantity of times of reading a second length, a proportion of the quantity of times of reading the first length to a total quantity of times of reading, and a proportion of the quantity of times of reading the second length to the total quantity of times of reading. The first length indicates that a length is 2n, the second length indicates that a length is non-2n, and n is a positive integer.

The read feature of the third data block adjacent to the to-be-trained data block includes at least read frequency features respectively corresponding to L third data blocks, and L is a positive integer. The L third data blocks may be L/2 third data blocks selected before the to-be-trained data block and L/2 third data blocks selected after the to-be-trained data block.

For example, the to-be-trained feature includes a feature of the to-be-trained data block at each of T historical time points. There is a temporal-spatial correlation between read/write frequency features of the to-be-trained data block at the T historical time points. T is a positive integer.

S502: The second apparatus sends the to-be-trained data set to the third apparatus. Correspondingly, the third apparatus receives the to-be-trained data set sent by the second apparatus.

S503: The third apparatus trains an initial network model by using the to-be-trained data set, to generate an access frequency prediction model.

In an embodiment, the third apparatus trains the initial network model by using the to-be-trained data set sent by the second apparatus, to generate the access frequency prediction model through training. The access frequency prediction model may include a first submodel and a second submodel. The first submodel is used to extract a temporal feature of the to-be-trained feature, and the second submodel is used to extract a spatial feature of the to-be-trained feature. For example, the first submodel is a CNN network, and the second submodel is an LSTM network. Further, to resolve a scale insensitive problem of a neural network model, the access frequency prediction model may further include a third submodel, and the third submodel is used to obtain a feature scale of the to-be-trained feature. The feature scale of the to-be-trained feature is a scale of a dimension of each feature in the to-be-trained feature. For example, the third submodel is an autoregressive model.

S504: The third apparatus sends the access frequency prediction model to the second apparatus. Correspondingly, the second apparatus receives the access frequency prediction model sent by the third apparatus.

In an embodiment, when the second apparatus monitors a change of a feature length, the second apparatus obtains a new to-be-trained data set. The new to-be-trained data set includes a plurality of to-be-trained features and labels corresponding to the plurality of to-be-trained features. The second apparatus sends the new to-be-trained data set to the third apparatus. Correspondingly, the third apparatus receives the new to-be-trained data set sent by the second apparatus, and trains the access frequency prediction model by using the new to-be-trained data set, to obtain the updated access frequency prediction model. The third apparatus may send the updated access frequency prediction model to the second apparatus, so that the second apparatus forwards the updated access frequency prediction model to the first apparatus. Alternatively, the third apparatus directly sends the updated access frequency prediction model to the first apparatus. Correspondingly, the first apparatus receives the updated access frequency prediction model sent by the third apparatus. In an embodiment, to avoid resource overheads caused by frequent training, the access frequency prediction model is generally trained again when a change amount of T or L is greater than a preset threshold.

For example, when monitoring the change of the feature length, the second apparatus may further send a changed feature length to the third apparatus. Correspondingly, the third apparatus receives the changed feature length sent by the second apparatus, to divide to-be-trained features in the to-be-trained data set by using the changed feature length, to obtain the plurality of to-be-trained features.

In addition, after generating the access frequency prediction model through training, the third apparatus may further perform lightweight processing on the access frequency prediction model, to reduce a size of the access frequency prediction model and reduce memory occupation, for example, perform processing such as pruning and compression on the access frequency prediction model. Further, to enable the first apparatus to accurately parse and use the access frequency prediction model, the third apparatus may further convert a file of the access frequency prediction model into a format supported by an interface of the first apparatus.

S505: The second apparatus forwards the access frequency prediction model to the first apparatus. Correspondingly, the first apparatus receives the access frequency prediction model sent by the second apparatus.

S506: The second apparatus obtains a first feature of a first data block.

S507: The second apparatus sends the first feature of the first data block to the first apparatus. Correspondingly, the first apparatus receives the first feature, sent by the second apparatus, of the first data block.

S508: The first apparatus inputs the first feature of the first data block into the access frequency prediction model, to obtain access frequency, output by the access frequency prediction model, of the first data block.

S509: The first apparatus sends the access frequency of the first data block to the second apparatus. Correspondingly, the second apparatus receives the access frequency, sent by the first apparatus, of the first data block.

It should be noted that, for implementations of S506 to S509 in an embodiment, refer to related descriptions of S401 to S404 in the embodiment shown in FIG. 4. Details are not described herein again in an embodiment.

For an operation performed after the second apparatus obtains the access frequency of the first data block, refer to related descriptions of S405 in the embodiment shown in FIG. 4. Details are not described herein again in an embodiment.

Figure 6:
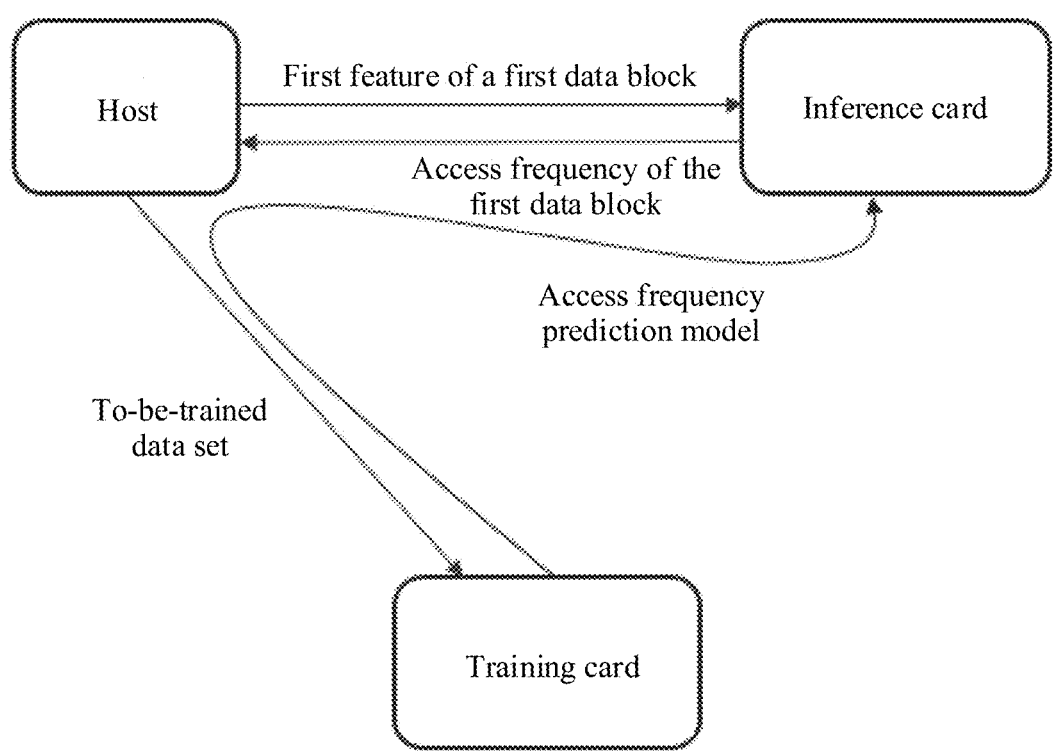
FIG. 6 is a diagram of a data processing framework according to an embodiment of this application.

For ease of understanding an embodiment of this application, refer to a diagram of a data processing framework in FIG. 6, including a host, a training card, and an inference card, as shown in FIG. 6. The host may implement a function of the second apparatus in an embodiment of this application, the inference card may implement a function of the first apparatus in an embodiment of this application, and the training card may implement a function of the third apparatus in an embodiment of this application. The host may collect a to-be-trained data set, and send the to-be-trained data set to the training card. The training card trains a model by using the to-be-trained data set, to obtain an access frequency prediction model, and sends the access frequency prediction model to the inference card by using the host. After the host obtains a first feature of a data block in storage space, the host sends the first feature of the data block to the inference card. The inference card inputs the first feature into the access frequency prediction model, to obtain access frequency of the data block. The inference card sends the access frequency of the data block to the host, so that the host determines a type of the data block based on the access frequency of the data block.

In an embodiment, the host may include a data collection module, a feature extraction module, a temporal-spatial feature processing module, and a data type identification module. The data collection module is configured to collect the data block in the storage space. The feature extraction module is configured to extract a feature of the data block. If a process is a training process, a label corresponding to the feature further needs to be obtained, to construct a to-be-trained data set with the label. If a process is a prediction process, only the feature of the data block needs to be extracted. The temporal-spatial feature processing module is configured to calculate a temporal correlation of the data block based on an autocorrelation function, to determine a temporal correlation parameter T, and calculate a spatial correlation of the data block based on a covariance function, to determine a spatial correlation parameter L. The data type identification module is configured to determine a type of the data block based on future access frequency of the data block.

In an embodiment, the training card may include a training module, a lightweight processing module, and a format matching module. The training module is configured to train an initial network model by using the to-be-trained data set, to obtain the access frequency prediction model. The training module may be a CPU or a graphics processing unit (graphics processing unit, GPU). The lightweight processing module is configured to perform lightweight processing on the access frequency prediction model, for example, perform processing such as pruning and compression, to reduce a volume of the access frequency prediction model and improve a prediction speed. The format matching module is configured to convert a file format of the access frequency prediction model into a format supported by an interface of the inference card.

In an embodiment, the inference card may include a model iteration module, a model loading module, an inference module, and a returning module. The model iteration module is configured to update the access frequency prediction model. The model loading module is configured to read an access frequency prediction model file. The inference module is configured to input the received first feature into the access frequency prediction model, to obtain a prediction result. The returning module is configured to send the prediction result to the host.

Figure 7:
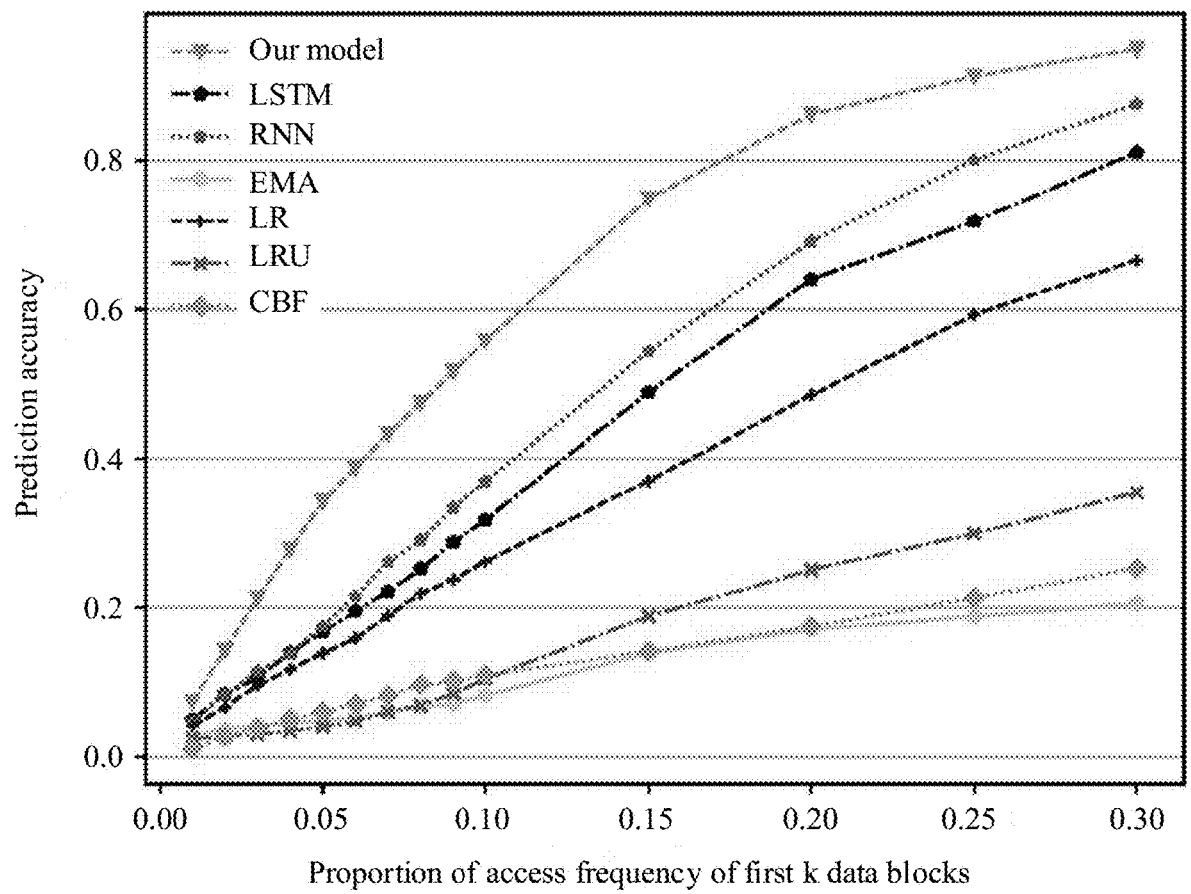
FIG. 7 is a diagram of a comparison between simulation architectures according to an embodiment of this application.

To further describe accuracy of the prediction result of the access frequency prediction model provided in an embodiment of this application, refer to FIG. 7. FIG. 7 shows a comparison of accuracy of predicting access frequency of a data block by using different models. A horizontal coordinate in the figure represents a ratio of a quantity of to-be-predicted hot data blocks to a total quantity of data blocks. For example, there are 1000 data blocks in total, and 0.1 on the horizontal coordinate represents that, in descending order of access frequency, first 100 data blocks are used as hot data blocks. A vertical coordinate indicates prediction accuracy. Simulation lines from bottom to top in FIG. 7 are sequentially a simulation line obtained based on an exponentially weighted moving average (EMA) model, a simulation line obtained based on a counting bloom filter (CBF) model, a simulation line obtained based on a least recently used (LRU) model, a simulation line obtained based on a linear regression (LR) model, a simulation line obtained based on an LSTM model, a simulation line obtained based on a recurrent neural network (RNN) model, and a simulation line obtained based on the access frequency prediction model (our model) provided in an embodiment of this application. It can be learned from FIG. 7 that at a same horizontal coordinate, prediction accuracy of the access frequency prediction model provided in an embodiment of this application is higher than prediction accuracy of other models.

Based on the foregoing method embodiments, an embodiment of this application provides a data processing apparatus. The following provides descriptions with reference to the accompanying drawings.

Figure 8:
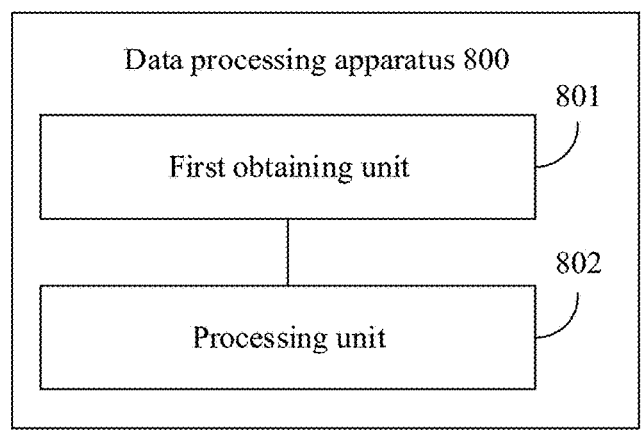
FIG. 8 is a diagram of a structure of a data processing apparatus according to an embodiment of this application.

FIG. 8 is a diagram of a structure of a data processing apparatus according to an embodiment of this application. The apparatus 800 may implement a function of the first apparatus in the foregoing embodiments. In an embodiment, the apparatus 800 may include modules or units that perform and one-to-one correspond to the methods/operations/steps/actions performed by the first apparatus in the foregoing method embodiments. The unit may be a hardware circuit or software, or may be implemented by combining a hardware circuit and software. In an embodiment, the apparatus may include a first obtaining unit 801 and a processing unit 802.

The first obtaining unit 801 is configured to obtain a first feature of a first data block. The first data block is any data block in storage space, and the first feature includes a read/write feature related to the first data block and a read feature of a second data block adjacent to the first data block. For implementations of the first obtaining unit 801, refer to related descriptions of S201, S402, and S507. Details are not described herein again in an embodiment.

The processing unit 802 is configured to input the first feature into an access frequency prediction model, to obtain access frequency, output by the access frequency prediction model, of the first data block. The access frequency of the first data block is used to determine a type of the first data block. For specific implementations of the processing unit 802, refer to related descriptions of S202, S403, and S508. Details are not described herein again in an embodiment.

In an embodiment, the apparatus further includes a receiving unit, configured to receive the first feature, sent by a second apparatus, of the first data block. The first obtaining unit 801 is configured to obtain the first feature received by the receiving unit. For implementations of the receiving unit and the first obtaining unit 801, refer to related descriptions of S402 and S507. Details are not described herein again in an embodiment.

In an embodiment, the apparatus further includes a sending unit (not shown in the figure).

The sending unit is configured to send the access frequency of the first data block to the second apparatus. For implementations of the sending unit, refer to related descriptions of S404 and S509. Details are not described herein again in an embodiment.

In an embodiment, the type of the first data block is the cold data or the hot data.

In an embodiment, the processing unit 802 is further configured to: when a feature length of the first feature changes, update the access frequency prediction model to obtain the updated access frequency prediction model. For implementations of the processing unit 802, refer to related descriptions of S202, S403, and S504. Details are not described herein again in an embodiment.

In an embodiment, the first obtaining unit 801 is further configured to obtain a second feature of the first data block. The feature length of the first feature is different from a feature length of the second feature. The processing unit 802 is further configured to input the second feature into the updated access frequency prediction model, to obtain access frequency, output by the updated access frequency prediction model, of the first data block. For implementations of the first obtaining unit 801, refer to related descriptions of S202 and S403. Details are not described herein again in an embodiment.

It should be noted that, for implementations of the units in an embodiment, refer to related descriptions in the method embodiments in FIG. 2, FIG. 4, and FIG. 5. Details are not described herein again in an embodiment.

Figure 9:
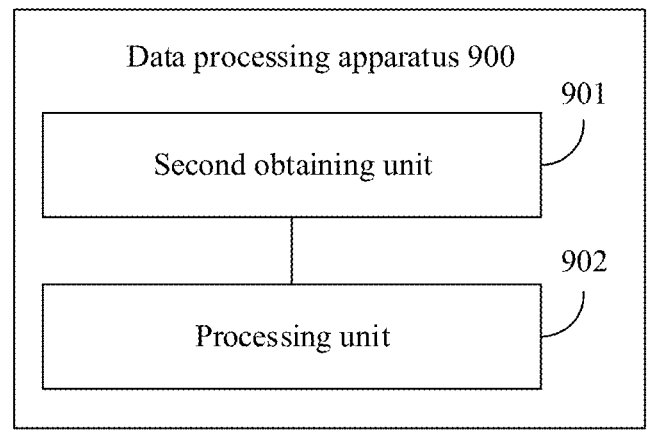
FIG. 9 is a diagram of a structure of another data processing apparatus according to an embodiment of this application.

FIG. 9 is a diagram of a structure of another data processing apparatus according to an embodiment of this application. The apparatus 900 may implement a function of the second apparatus in the foregoing method embodiments. In an embodiment, the apparatus 900 may include modules or units that perform and one-to-one correspond to the methods/operations/steps/actions performed by the second apparatus in the foregoing method embodiments. The unit may be a hardware circuit or software, or may be implemented by combining a hardware circuit and software. In an embodiment, the apparatus further includes a second obtaining unit 901 and a processing unit 902.

The second obtaining unit 901 is configured to obtain access frequency of a first data block. The access frequency of the first data block is obtained based on an access frequency prediction model and a first feature of the first data block. The first feature includes a read/write feature related to the first data block and a read feature of a second data block adjacent to the first data block, and the first data block is any data block in storage space. For implementations of the second obtaining unit 901, refer to related descriptions of S404 and S509. Details are not described herein again in an embodiment.

The processing unit 902 is configured to determine a type of each first data block in the storage space based on access frequency of each first data block. For implementations of the processing unit 902, refer to related descriptions of S202 and S405. Details are not described herein again in an embodiment.

In an embodiment, the processing unit 902 is configured to: rank first data blocks based on access frequency of the first data blocks to obtain a ranking result, and determine types of the first data blocks in the storage space based on the ranking result. For implementations of the processing unit 902, refer to related descriptions of S202 and S405. Details are not described herein again in an embodiment.

In an embodiment, the first feature includes a feature of the first data block at each of T historical time points. There is a temporal-spatial correlation between read/write features of the first data block at the T historical time points, and T is a positive integer.

In an embodiment, the read/write feature related to the first data block includes at least one of the following: a frequency feature of reading/writing the first data block, a length feature of reading the first data block, and an alignment feature of reading the first data block.

In an embodiment, the frequency feature of reading/writing the first data block includes following: frequency at which one or more access interfaces read the first data block, frequency at which the one or more access interfaces write the first data block, and total frequency at which the one or more access interfaces read/write the first data block.

In an embodiment, the length feature of reading the first data block includes at least one of the following: a maximum read length, a minimum read length, or an average read length.

In an embodiment, the alignment feature of reading the first data block includes at least one of the following: a quantity of times of reading a first length, a quantity of times of reading a second length, and a proportion of the quantity of times of reading the first length to a total quantity of times of reading or a proportion of the quantity of times of reading the second length to the total quantity of times of reading. The first length indicates that a length is 2n, the second length indicates that a length is non-2n, and n is a positive integer.

In an embodiment, the read feature of the second data block adjacent to the first data block includes at least read frequency features respectively corresponding to L second data blocks, and L is a positive integer.

In an embodiment, the access frequency prediction model includes a first submodel and a second submodel. The first submodel is used to extract a temporal feature of the first feature, and the second submodel is used to extract a spatial feature of the first feature.

In an embodiment, the access frequency prediction model further includes a third submodel. The third submodel is used to obtain a feature scale of the first feature.

In an embodiment, the access frequency prediction model is generated through training based on to-be-trained features and labels corresponding to the to-be-trained features. The labels corresponding to the to-be-trained features are access frequency.

In an embodiment, the apparatus further includes a third obtaining unit (not shown in the figure).

The third obtaining unit is configured to: when the feature length of the first feature changes, obtain a new to-be-trained data set. The new to-be-trained data set includes a plurality of to-be-trained features and labels corresponding to the plurality of to-be-trained features. The new to-be-trained data set is used to train the access frequency prediction model, to obtain the updated access frequency prediction model. For implementations of a fourth obtaining unit, refer to related descriptions of S403 and S504. Details are not described herein again in an embodiment.

In an embodiment, the apparatus further includes a sending unit and a receiving unit (not shown in the figure).

The sending unit is configured to send the new to-be-trained data set to a third apparatus, so that the third apparatus trains the access frequency prediction model by using the new to-be-trained data set, to obtain the updated access frequency prediction model. The receiving unit is configured to receive the updated access frequency prediction model sent by the third apparatus. For implementations of the sending unit and the receiving unit refer to related descriptions of S502 and S504. Details are not described herein again in an embodiment.

In an embodiment, the apparatus further includes a sending unit (not shown in the figure).

The sending unit is configured to send the updated access frequency prediction model to the first apparatus. For a implementation of the sending unit, refer to related descriptions of S505. Details are not described herein again in an embodiment.

In an embodiment, that a feature length of the first feature changes includes that a quantity T of the historical time points changes, and/or a quantity L of the second data blocks adjacent to the first data block changes, where T is a positive integer, and L is a positive integer.

In an embodiment, the apparatus further includes a receiving unit and a sending unit (not shown in the figure).

The second obtaining unit 901 is configured to obtain the first feature of the first data block. The sending unit is configured to send the first feature of the first data block to the first apparatus. The receiving unit is configured to receive the access frequency, sent by the first apparatus, of the first data block. The access frequency of the first data block is obtained by the first apparatus by using the access frequency prediction model and the first feature.

It should be noted that, for implementations of the units in an embodiment, refer to related descriptions in the foregoing method embodiments. Details are not described herein again in an embodiment.

Figure 10:
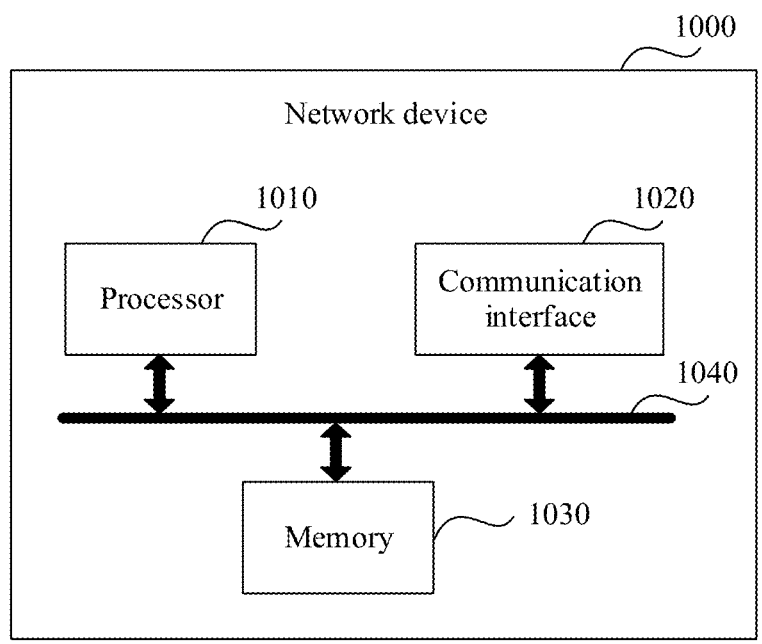
FIG. 10 is a diagram of a structure of a network device according to an embodiment of this application.

FIG. 10 is a schematic diagram of a structure of a network device according to an embodiment of this application. For example, the network device may be the first apparatus, the second apparatus, or the third apparatus in embodiments shown in FIG. 2 to FIG. 5, or may be a device of the data processing apparatus 800 in the embodiment shown in FIG. 8 or a device of the data processing apparatus 900 in the embodiment shown in FIG. 9.

As shown in FIG. 10, a network device 1000 includes at least a processor 1010. The network device 1000 may further include a communication interface 1020 and a memory 1030. There may be one or more processors 1010 in the network device 1000. In FIG. 10, one processor is used as an example. In an embodiment of this application, the processor 1010, the communication interface 1020, and the memory 1030 may be connected by using a bus system or in another manner. In FIG. 10, an example in which the processor 1010, the communication interface 1020, and the memory 1030 are connected by using a bus system 1040 is used.

The processor 1010 may be a CPU, a network processor (NP), or a combination of a CPU and an NP. The processor 1010 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

When the network device is the first apparatus, the processor 1010 may perform a related function of the foregoing method embodiments, for example, input the first feature into an access frequency prediction model, to obtain access frequency, output by the access frequency prediction model, of the first data block.

When the network device is the second apparatus, the processor 1010 may perform a related function of the foregoing method embodiments, for example, determine a type of each first data block in the storage space based on access frequency of each first data block.

When the network device is the third apparatus, the processor 1010 may perform a related function of the foregoing method embodiments, for example, generate an access frequency prediction model through training.

The communication interface 1020 is configured to receive and send the first feature. For example, the communication interface 1020 may include a receiving interface and a sending interface. The receiving interface may be configured to receive the first feature, and the sending interface may be configured to send the first feature. There may be one or more communication interfaces 1020.

The memory 1030 may include a volatile memory, for example, a random access memory (RAM). The memory 1030 may further include a non-volatile memory, for example, a flash memory, a hard disk drive (HDD), or a solid-state drive (SSD). The memory 1030 may further include a combination of the foregoing types of memories. The memory 1030 may store, for example, the access frequency prediction model or the first feature of first data.

In an embodiment, the memory 1030 stores an operating system, a program, an executable module or a data structure, a subset thereof, or an extended set thereof, where the program may include various operation instructions, to implement various operations. The operating system may include various system programs, to implement various basic services and process a hardware-based task. The processor 1010 may read the program in the memory 1030, to implement the data processing method in embodiments of this application.

The memory 1030 may be a storage device in the network device 1000, or may be a storage apparatus independent of the network device 1000.

The bus system 1040 may be a peripheral component interconnect (PCI) bus, an extended industry standard architecture (EISA) bus, or the like. The bus system 1040 may be classified into an address bus, a data bus, a control bus, and the like. For ease of representation, only one thick line is for representing the bus in FIG. 10, but this does not mean that there is only one bus or only one type of bus.

Figure 11:
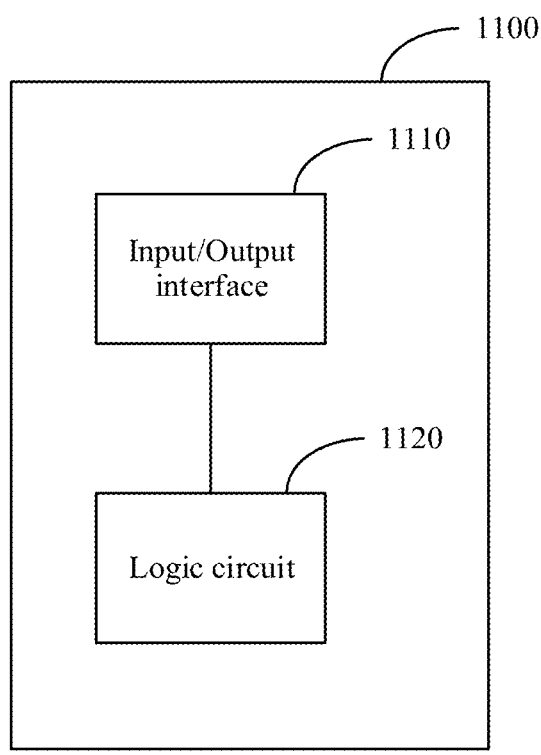
FIG. 11 is a diagram of a structure of a data processing apparatus according to an embodiment of this application.

Refer to FIG. 11. An embodiment of this application further provides a data processing apparatus 1100, which may be configured to implement functions of the first apparatus, the second apparatus, or the third apparatus in the foregoing methods. The apparatus 1100 may be an apparatus or a chip in the apparatus. The data processing apparatus includes:

at least one input/output interface 1110 and a logic circuit 1120. The input/output interface 1110 may be an input/output circuit. The logic circuit 1120 may be a signal processor, a chip, or another integrated circuit that can implement the methods in this application.

The at least one input/output interface 1110 is configured to input or output a signal or data. For example, when the apparatus is the first apparatus, the input/output interface 1110 is configured to receive the first feature of the first data block. For example, when the apparatus is the second apparatus, the input/output interface 1110 is configured to output the first feature of the first data block.

The logic circuit 1120 is configured to perform a part or all of the operations in any one of the methods provided in embodiments of this application. For example, when the apparatus is the first apparatus, the apparatus is configured to perform the operations performed by the first apparatus in the possible implementations in the foregoing method embodiments. For example, the logic circuit 1120 is configured to obtain the access frequency of the first data block based on the first feature of the first data block. When the apparatus is the second apparatus, the apparatus is configured to perform the operations performed by the second apparatus in the possible implementations in the foregoing method embodiments. For example, the logic circuit 1120 is configured to obtain the data type of the first data block.

When the apparatus is a chip used in a terminal, the chip in the terminal implements functions of the terminal in the foregoing method embodiments. The chip in the terminal receives information from another module (for example, a radio frequency module or an antenna) in the terminal, where the information is sent by another terminal or a network device to the terminal. Alternatively, the chip in the terminal outputs information to another module (for example, a radio frequency module or an antenna) in the terminal, where the information is sent by the terminal to another terminal or a network device.

When the apparatus is a chip used in a network device, the chip in the network device implements functions of the network device in the foregoing method embodiments. The chip in the network device receives information from another module (for example, a radio frequency module or an antenna) in the network device, where the information is sent by a terminal or another network device to the network device. Alternatively, the chip in the network device outputs information to another module (for example, a radio frequency module or an antenna) in the network device, where the information is sent by the network device to a terminal or another network device.

This application further provides a chip or a chip system. The chip may include a processor. The chip may further include a memory (or a storage module) and/or a transceiver (or a communication module), or the chip is coupled to the memory (or the storage module) and/or the transceiver (or the communication module). The transceiver (or the communication module) may be configured to support the chip in wired and/or wireless communication, and the memory (or the storage module) may be configured to store a program or a group of instructions. The processor invokes the program or the group of instructions to implement an operation performed by a terminal or a network device in any one of the foregoing method embodiments or the possible implementations of the method embodiments. The chip system may include the chip, or may include the chip and another discrete component, such as a memory (or a storage module) and/or a transceiver (or a communication module).

An embodiment of this application provides a computer-readable storage medium, including instructions or a computer program. When the instructions or the computer program are/is run on a computer, the computer is enabled to perform the data processing method in the foregoing embodiment.

An embodiment of this application further provides a computer program product including instructions or a computer program. When the instructions or the computer program product are/is run on a computer, the computer is enabled to perform the data processing method in the foregoing embodiment.

Based on a same concept as the foregoing method embodiments, this application further provides a data processing system. The data processing system may include the foregoing first apparatus and second apparatus. The data processing system may be used to implement an operation performed by the first apparatus or the second apparatus in any one of the foregoing method embodiments or the possible implementations of the foregoing method embodiments.

In the specification, claims, and accompanying drawings of this application, the terms "first", "second", "third", "fourth", and so on (if existent) are intended to distinguish between similar objects but do not necessarily indicate an order or sequence. It should be understood that the data termed in such a way are interchangeable in proper circumstances so that embodiments of the present disclosure described herein can be implemented in other orders than the order illustrated or described herein. In addition, the terms "include" and "have" and any other variants are intended to cover the non-exclusive inclusion. For example, a process, method, system, product, or device that includes a list of operations or units is not necessarily limited to those expressly listed operations or units, but may include other operations or units not expressly listed or inherent to such a process, method, product, or device.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into units is merely logical service division and may be another division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, service units in embodiments of this application may be integrated into one processing unit, or each of the units may exist alone physically, or two or more units may be integrated into one unit. The integrated unit may be implemented in a form of hardware, or may be implemented in a form of a software service unit.

When the integrated unit is implemented in a form of a software service unit and sold or used as an independent product, the integrated unit may be stored in a computer-readable storage medium. Based on such an understanding, the technical solutions of this application essentially, or all or some of the technical solutions may be implemented in a form of a software product. The computer software product is stored in a storage medium, and includes several instructions for instructing a computer device (which may be a personal computer, a server, a network device, or the like) to perform all or some of the operations of the methods described in embodiments of this application. The storage medium includes any medium that can store program code, such as a USB flash drive, a removable hard disk drive, a read-only memory (ROM), a random access memory (RAM), a magnetic disk, or an optical disc.

Persons skilled in the art should be aware that in the foregoing one or more examples, the services described in this application may be implemented by hardware, software, firmware, or any combination thereof. When the services are implemented by using the software, the services may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another. The storage medium may be any available medium accessible to a general-purpose or a dedicated computer.

In the foregoing implementations, the objectives, technical solutions, and the benefits of this application are further described in detail. It should be understood that the foregoing descriptions are merely implementations of this application.

The foregoing embodiments are merely intended for describing the technical solutions of this application instead of limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A data processing method, comprising:
   obtaining, by a first apparatus, a first feature of a first data block, that is any data block in storage space, wherein the first feature comprises (1) a read/write feature related to the first data block and (2) a read feature of a second data block adjacent to the first data block; and
   inputting, by the first apparatus, the first feature into an access frequency prediction model, to obtain an access frequency, output by the access frequency prediction model, of the first data block, wherein the access frequency of the first data block is used to determine a type of the first data block.

2. The method according to claim 1, wherein the obtaining the first feature of the first data block comprises:
   receiving, by the first apparatus, the first feature of the first data block sent by a second apparatus.

3. The method according to claim 2, further comprising:
sending, by the first apparatus, the access frequency of the first data block to the second apparatus.

4. The method according to claim 1, comprising:
in response to changing a feature length of the first feature, updating, by the first apparatus, the access frequency prediction model to obtain an updated access frequency prediction model.

5. A data processing method, comprising:
obtaining, by a second apparatus, an access frequency of a first data block, wherein the access frequency of the first data block is obtained based on an access frequency prediction model and a first feature of the first data block, the first feature comprises (1) a read/write feature related to the first data block and (2) a read feature of a second data block adjacent to the first data block, and the first data block is any data block in storage space; and determining, by the second apparatus, a type of the first data block in the storage space based on the access frequency of the first data block.

6. The method according to claim 5 wherein the first feature comprises a feature of the first data block at each of T historical time points, wherein a temporal-spatial correlation is between read/write features of the first data block at the T historical time points, and T is a positive integer.

7. The method according to claim 5, wherein the read/write feature related to the first data block comprises at least one of: a frequency feature of reading/writing the first data block, a length feature of reading the first data block, or an alignment feature of reading the first data block.

8. The method according to claim 7, wherein the read/write feature related to the first data block satisfies at least one of:
the frequency feature of reading/writing the first data block comprises at least one of: frequency at which an access interface reads the first data block, frequency at which the access interface writes the first data block, or total frequency at which the access interface reads/writes the first data block;
the length feature of reading the first data block comprises at least one of: a maximum read length, a minimum read length, or an average read length; or
the alignment feature of reading the first data block comprises at least one of: a quantity of times of reading a first length, a quantity of times of reading a second length, a proportion of the quantity of times of reading the first length to a total quantity of times of reading or a proportion of the quantity of times of reading the second length to the total quantity of times of reading, wherein the first length indicates that a length is 2n, the second length indicates that a length is non-2n, and n is a positive integer.

9. The method according to claim 5, wherein the read feature of the second data block adjacent to the first data block comprises at least read frequency features respectively corresponding to L second data blocks, and L is a positive integer.

10. The method according to claim 1, wherein the access frequency prediction model comprises a first submodel and a second submodel, the first submodel is used to extract a temporal feature of the first feature, and the second submodel is used to extract a spatial feature of the first feature.

11. The method according to claim 5, comprising:
in response to changing a feature length of the first feature, obtaining, by the second apparatus, a new to-be-trained data set comprising a plurality of to-be-trained features and labels corresponding to the plurality of to-be-trained features, and the new to-be-trained data set is used to train the access frequency prediction model, to obtain an updated access frequency prediction model.

12. The method according to claim 11, wherein changing the feature length of the first feature comprises changing a quantity T of historical time points, and/or changing a quantity L of second data blocks adjacent to the first data block, wherein T is a positive integer, and L is a positive integer.

13. The method according to claim 5, wherein the obtaining the access frequency of the first data block comprises:
obtaining, by the second apparatus, the first feature of the first data block, and sending the first feature of the first data block to a first apparatus; and
receiving, by the second apparatus, the access frequency, sent by the first apparatus, of the first data block, wherein the access frequency of the first data block is obtained by the first apparatus by using the access frequency prediction model and the first feature.

14. A data processing apparatus, comprising:
a processor, and
a memory coupled to the processor to store instructions, which when executed by the processor, cause the processor to perform operations, the operations comprising:
obtaining a first feature of a first data block that is any data block in storage space, and the first feature comprises (1) a read/write feature related to the first data block and (2) a read feature of a second data block adjacent to the first data block; and
inputting the first feature into an access frequency prediction model, to obtain access frequency, output by the access frequency prediction model, of the first data block, wherein the access frequency of the first data block is used to determine a type of the first data block.

15. The apparatus according to claim 14, the operations further comprising:
a receiving unit, configured to receive the first feature, sent by a second apparatus, of the first data block.

16. The apparatus according to claim 15, the operations further comprising:
sending the access frequency of the first data block to the second apparatus.

17. The apparatus according to claim 14, the operations further comprising:
in response to changing a feature length of the first feature, updating the access frequency prediction model to obtain an updated access frequency prediction model.

18. A data processing apparatus, comprising:
a processor, and
a memory coupled to the processor to store instructions, which when executed by the processor, cause the processor to perform operations, the operations comprising:
obtaining access frequency of a first data block, wherein the access frequency of the first data block is obtained based on an access frequency prediction model and a first feature of the first data block, the first feature comprises (1) a read/write feature related to the first data block and (2) a read feature of a second data block adjacent to the first data block, and the first data block is any data block in storage space; and determining a type of the first data block in the storage space based on the access frequency of the first data block.

19. The apparatus according to claim 18, wherein the first feature comprises a feature of the first data block at each of T historical time points, wherein a temporal-spatial correlation is between read/write features of the first data block at the T historical time points, and T is a positive integer.

20. The apparatus according to claim 18, wherein the read/write feature related to the first data block comprises at least one of: a frequency feature of reading/writing the first data block, a length feature of reading the first data block, or an alignment feature of reading the first data block.

* * * * *